US012266923B2

(12) United States Patent
Li et al.

(10) Patent No.: US 12,266,923 B2
(45) Date of Patent: Apr. 1, 2025

(54) PROTECTION CIRCUIT FOR BATTERY MANAGEMENT SYSTEM

(71) Applicant: A123 Systems LLC, Novi, MI (US)

(72) Inventors: Yue Li, Novi, MI (US); Steve Gierlach, Novi, MI (US); Weiwei Lin, Hangzhou (CN); Brian Large, Novi, MI (US); Jiaping Zhang, Hangzhou (CN); Ke Xu, Hangzhou (CN)

(73) Assignee: A123 SYSTEMS LLC, Novi, MI (US)

( * ) Notice: Subject to any disclaimer, the term of this patent is extended or adjusted under 35 U.S.C. 154(b) by 4 days.

(21) Appl. No.: 18/302,732

(22) Filed: Apr. 18, 2023

(65) Prior Publication Data
US 2023/0253780 A1 Aug. 10, 2023

Related U.S. Application Data

(62) Division of application No. 17/342,447, filed on Jun. 8, 2021, now Pat. No. 11,670,938.
(Continued)

(51) Int. Cl.
*H01M 10/42* (2006.01)
*B60L 50/60* (2019.01)
(Continued)

(52) U.S. Cl.
CPC .............. *H02H 7/18* (2013.01); *B60L 50/66* (2019.02); *B60L 58/10* (2019.02);
(Continued)

(58) Field of Classification Search
CPC ........ B60L 3/0046; B60L 50/66; B60L 58/10; H01M 10/4257; H01M 2010/4271;
(Continued)

(56) References Cited

U.S. PATENT DOCUMENTS

| 4,581,590 A | * | 4/1986 | Sunderland | ........... | H03F 1/0244 |
| | | | | | 330/297 |
| 7,283,343 B2 | | 10/2007 | Grose et al. | | |

(Continued)

FOREIGN PATENT DOCUMENTS

| KR | 20180099161 A | 9/2018 |
| KR | 20190094714 A | 8/2019 |
| WO | 2018081306 A1 | 5/2018 |

OTHER PUBLICATIONS

ISA Korean Intellectual Property Office, International Search Report and Written Opinion Issued in Application No. PCT/US2021/036492, Sep. 30, 2021, WIPO, 12 pages.

*Primary Examiner* — Victoria H Lynch
(74) *Attorney, Agent, or Firm* — McCoy Russell LLP

(57) ABSTRACT

Systems and methods are provided for a battery management system (BMS) having a protection circuit. In one example, a vehicle battery system may include the BMS, the BMS including a cutoff circuit coupled to a short-circuit protection circuit, and a battery pack, wherein the short-circuit protection circuit may include a diode array, cathodes of the diode array being coupled to a positive terminal post of the battery pack and anodes of the diode array being coupled to a negative terminal post of the battery pack. In some examples, the cutoff circuit may further be coupled to a reverse bias protection circuit including a switchable current path arranged between a control input of the cutoff circuit and an output of the cutoff circuit. In this way, the vehicle battery system may be protected from unexpected voltage conditions via the BMS redirecting and dissipating excess current away from the cutoff circuit.

20 Claims, 8 Drawing Sheets

Related U.S. Application Data

(60) Provisional application No. 63/042,963, filed on Jun. 23, 2020, provisional application No. 63/036,346, filed on Jun. 8, 2020.

(51) Int. Cl.
*B60L 58/10* (2019.01)
*H02H 1/00* (2006.01)
*H02H 7/18* (2006.01)

(52) U.S. Cl.
CPC ...... *H01M 10/4257* (2013.01); *H02H 1/0007* (2013.01); *H01M 2010/4271* (2013.01); *H01M 2220/20* (2013.01)

(58) Field of Classification Search
CPC ........... H01M 2220/20; H01M 50/103; H01M 50/249; H02H 1/0007; H02H 7/18; H02J 7/0031; H02J 7/0034; Y02E 60/10; Y02T 10/70
See application file for complete search history.

(56) References Cited

U.S. PATENT DOCUMENTS

| | | | |
|---|---|---|---|
| 2016/0241013 A1 | 8/2016 | Togo Peraza et al. | |
| 2016/0329266 A1* | 11/2016 | Riou | H01L 23/3675 |
| 2019/0027945 A1 | 1/2019 | Gagnon et al. | |
| 2020/0110128 A1* | 4/2020 | Liu | H03K 3/011 |
| 2020/0381929 A1* | 12/2020 | Jin | H02J 7/00 |

\* cited by examiner

PROTECTION CIRCUIT FOR BATTERY MANAGEMENT SYSTEM

CROSS REFERENCE TO RELATED APPLICATIONS

The present application is a divisional of U.S. Non-Provisional Application Ser. No. 17/342,447, entitled "PROTECTION CIRCUIT FOR BATTERY MANAGEMENT SYSTEM" and filed on Jun. 8, 2021. U.S. Non-Provisional application Ser. No. 17/342,447 claims priority to U.S. Provisional Application No. 63/036,346, entitled "PROTECTION CIRCUIT FOR BATTERY MANAGEMENT SYSTEM" and filed on Jun. 8, 2020. U.S. Non-Provisional application Ser. No. 17/342,447 claims further priority to U.S. Provisional Application No. 63/042,963, entitled "PROTECTION CIRCUIT FOR BATTERY MANAGEMENT SYSTEM" and filed on Jun. 23, 2020. The entire contents of each of the above-identified application are hereby incorporated by reference for all purposes.

FIELD

The present description relates generally to a battery management system including a protection circuit, in particular for a battery pack in a vehicle.

BACKGROUND AND SUMMARY

Lithium-ion secondary (rechargeable) batteries are commonly employed for starting and powering electric and hybrid-electric vehicles. According to power requirements and application, a plurality of lithium-ion batteries may be assembled into a battery pack. For example, a 48 V battery pack may be installed in a battery-assisted hybrid vehicle (BAHV) so as to provide power to the BAHV during operations having low engine load, such as coasting, braking, and idling.

Under certain conditions, such as during a short-circuit event, relatively high currents (for example, up to 1700 A) may be generated across the battery pack or across a battery management system (BMS) electrically coupled thereto. Such high currents may result in voltage spikes which risk degradation to electronic components included in the BMS, such as metal-oxide-semiconductor field-effect transistors (MOSFETs) and/or other switches and relays.

Accordingly, protection circuits have been developed to mitigate such voltage spikes. As one example, a current detection circuit may be implemented in the BMS to detect a higher current characteristic of a short-circuit event, permitting the BMS to timely switch OFF a given MOSFET at risk of receiving the higher current. However, even if the higher current is detected in time to successfully switch OFF the MOSFET in the BMS, energy accumulated in inductive elements, such as in an electrical load, or in electrical lines coupling battery system components may result in the MOSFET being conducted (that is, reaching a breakdown voltage) and entering avalanche mode. The MOSFET may therefore be at risk of degradation even when switched OFF.

The inventors have identified the above issues and have determined solutions to at least partially solve them. In one example, a vehicle battery system is provided, the vehicle battery system including a battery management system (BMS) including a cutoff circuit electrically coupled to a short-circuit protection circuit, and a battery pack, where a positive supply line of the battery pack is electrically coupled to the cutoff circuit and where a ground return line of the battery pack is electrically coupled to the short-circuit protection circuit, wherein the short-circuit protection circuit includes a diode array, where cathodes of the diode array are directly electrically coupled to a positive terminal post of the battery pack and anodes of the diode array are directly electrically coupled to a negative terminal post of the battery pack. In this way, the vehicle battery system may be protected from degradation by redirecting and dissipating current resulting from undesirable voltage conditions.

In one example, a vehicle battery system is provided having a battery pack coupled to a BMS. Specifically, a positive supply line of the battery pack may be electrically coupled to a drain terminal of a MOSFET included in the BMS and a ground return line of the battery pack may be electrically coupled to a diode array. Further, a gate terminal and a source terminal of the MOSFET may be electrically coupled to a reverse bias protection circuit, the source terminal further electrically coupled to the diode array. Accordingly, in a higher-current environment accompanying application of a reverse bias voltage or a short-circuit event, a gate-source voltage ($V_{GS}$) of the MOSFET may be maintained below a threshold voltage ($V_{th}$) by directing current to a low-current leakage transistor in the reverse bias protection circuit. As such, the reverse bias protection circuit may maintain an OFF state in the MOSFET even upon application of the reverse bias voltage or during the short-circuit event.

The diode array may provide an additional low-resistance path for current dissipation when the MOSFET is switched OFF due to reverse bias voltage or short-circuit conditions. Specifically, the diode array may be coupled between positive and negative terminal posts of the battery pack such that current may cycle across an electrical load and the diode array and thereby dissipate energy accumulated in the vehicle battery system. As such, the reverse bias protection circuit and the diode array may function in tandem to redirect and dissipate excess current generated in the vehicle battery system, thereby preventing the MOSFET both from switching ON and from surpassing a breakdown voltage when switched OFF.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1A:
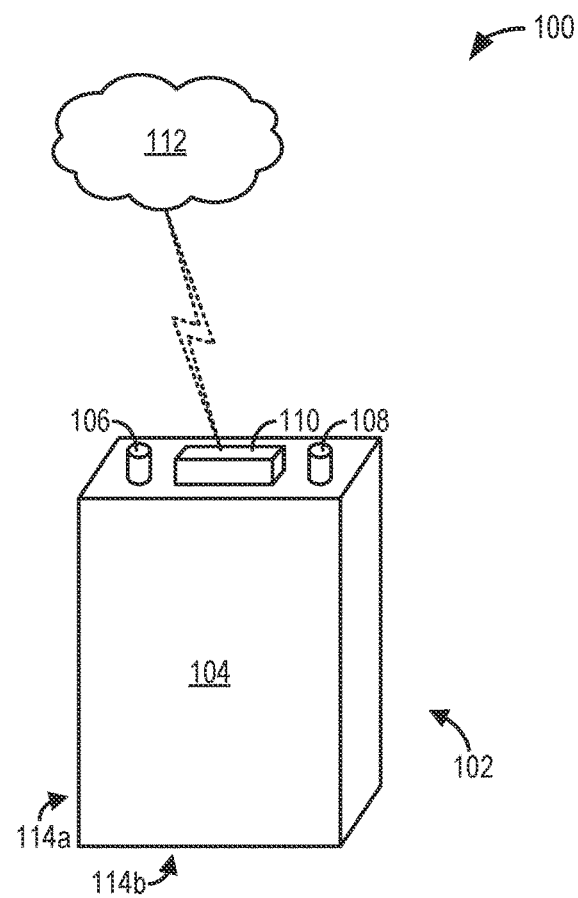
FIG. 1A shows a schematic diagram of an exemplary battery pack assembly.

The following description relates to systems and methods for a protection circuit for a battery pack, for example, a lithium-ion battery pack for powering an electric or hybrid-electric vehicle. The lithium-ion battery pack may include a plurality of lithium-ion battery cells assembled in a stacked configuration. As an example, the lithium-ion battery pack may be a 48V battery pack for starting or providing power to a battery-assisted hybrid vehicle (BAHV). Further, the protection circuit may be included in a battery management system (BMS) coupled to the lithium-ion battery pack.

Specifically, the protection circuit may maintain a cutoff circuit in an OFF state upon application of an unexpected reverse bias voltage, for example, due to a reversed polarity event. The cutoff circuit may include one or more of field-effect transistors (FETs), such as metal-oxide semiconductor FETs (MOSFETs), junction gate FETs (JFETs), etc., other types of transistors, or a combination thereof. In one example, the cutoff circuit may be a single MOSFET. In an additional or alternative example, the protection circuit may include a low-current leakage transistor, such as a bipolar junction transistor (BJT), which may maintain a gate-source voltage ($V_{GS}$) of the MOSFET below a threshold voltage ($V_{th}$) by maintaining a near-zero collector-emitter voltage ($V_{CE}$) when the reverse bias voltage is applied to a source terminal of the MOSFET.

The protection circuit may further protect the cutoff circuit from reaching a breakdown voltage and conducting upon being switched OFF, for example, when a voltage spike is detected by the BMS during a short-circuit event. Specifically, the protection circuit may include a diode array coupled to the source terminal of the MOSFET, where cathodes and anodes of the diode array may further be coupled to an electrical load coupled to each of the battery pack and the BMS. In one example, the diode array may include a plurality of flyback or freewheeling diodes. Accordingly, energy accumulated before or during the voltage spike may be cycled and dissipated across the diode array and the electrical load. In this way, the cutoff circuit, and thereby the BMS and the lithium-ion battery pack, may be protected from voltage spikes incurred by both reversed polarity situations, such as due to negative electric noise or positive and negative leads miscoupled to terminal posts of the lithium-ion battery pack, and short-circuit situations which may otherwise send the MOSFET into avalanche mode. Further, the protection circuit provided by the present disclosure may protect the BMS from relatively high currents (for example, up to 1700 A), even at relatively high temperatures (for example, up to 140° C.), and may extend acceptable lifetime degradation, such that the BMS may continue to function within an expected longevity of individual hardware components included therein.

As used herein, when referring to two components of a circuit, "coupled" may refer to "electrically coupled" unless otherwise specified. Accordingly, when referring to two components of a circuit, "directly coupled" may refer to the two components being electrically coupled without any electrical components (e.g., resistors, transistors, capacitors, etc.) disposed therebetween, excepting an electrical conductor (such as a wire and/or a busbar). In addition, transistors described as being "ON" allow current to flow through the transistors, whereas transistors described as being "OFF" prevent or substantially restrict current flow through the transistors ("substantially" may be used herein as a qualifier meaning "effectively").

Figure 1B:
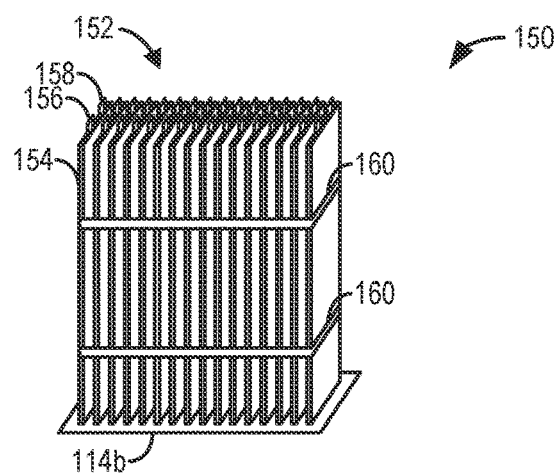
FIG. 1B shows a schematic diagram of the exemplary battery pack assembly with at least a portion of an external housing removed, exposing a plurality of stacked battery cells.

FIG. 1A depicts an exemplary battery pack assembly for a vehicle system. FIG. 1B depicts the battery pack assembly with at least a portion of an external housing thereof removed, such that a battery pack including a plurality of stacked lithium-ion battery cells is exposed. The battery pack may be included in the exemplary vehicle battery system of FIG. 2, where the battery pack may be coupled to a BMS. The BMS may include a protection circuit, exemplary circuitry of which is depicted in FIGS. 3A and 3B. In some examples, the protection circuit may be configured to maintain a cutoff circuit of the BMS in an OFF state when no switch ON request has been received. In additional or alternative examples, the protection circuit may be configured to maintain at least one component of the cutoff circuit in the OFF state even when a switch ON request is received, so that electric current flow from one or more of the plurality of stacked lithium-ion battery cells to an electrical load may be prevented. However, in such examples, it will be appreciated that accumulated energy in the vehicle battery system may be cycled through the electrical load. Accordingly, a method for managing current flow through the cutoff circuit, for example, which may include maintaining the cutoff circuit in the OFF state and dissipating any accumulated energy, is provided in FIG. 4. Example operating sequences of the BMS for managing current flow through the cutoff circuit and the protection circuit are provided in FIGS. 5A and 5B. FIG. 6 provides one exemplary printed circuit board assembly (PCBA) for implementing the BMS including the protection circuit, where the PCBA may include a plurality of busbars for coupling various components in the vehicle battery system and mitigating parasitic inductances.

Referring now to FIG. 1A, a schematic diagram 100 depicting a battery pack assembly 102 is shown. The battery pack assembly 102 may be configured for starting or powering a vehicle, such as an electric vehicle or a hybrid-electric vehicle. For example, the battery pack assembly 102 may include a 48V battery pack including a plurality of lithium-ion battery cells (as described below in detail with reference to FIG. 1B).

The plurality of lithium-ion battery cells may be arranged in a stacked configuration and removably enclosed within an external housing 104. Accordingly, the external housing 104 may be composed of a material having a low electrical conductivity, such as a plastic or other polymer, so as to reduce shorting events within the vehicle. The external housing 104, depicted in FIG. 1A as a rectangular prism, may be molded to be clearance fit into the vehicle such that the battery pack assembly 102 may be in face-sharing contact with one or more components of the vehicle, such as one or more engine components.

The external housing 104 may further be configured to include openings or cavities for interfacial components of the battery pack assembly 102. For example, the external housing 104 may be configured to expose a positive terminal post 106 and a negative terminal post 108, which may each be a lead-free terminal, for example. That is, the positive terminal post 106 and the negative terminal post 108 may be insert-molded in place on the external housing 104. Within the vehicle, the positive terminal post 106 and the negative terminal post 108 may respectively be electrically coupled to positive and negative leads such that the battery pack assembly 102 may form a closed circuit with an electrical load of the vehicle, such that power may be provided to the vehicle.

The positive terminal post 106 and the negative terminal post 108 may be configured with differing colors, shapes, symbols, etc. so as to indicate which of the terminal posts 106, 108 is positive and which is negative. For example, the positive terminal post 106 may be red and denoted with a plus symbol (+) and the negative terminal post 108 may be black and denoted with a negative symbol (−). Nevertheless, in some circumstances the positive and negative leads may be erroneously miscoupled, such that the positive lead may be coupled to the negative terminal post 108 and the negative lead may be coupled to the positive terminal post 106. In such circumstances, a reversed bias of applied potential difference may result, and the battery pack assembly 102 may unexpectedly discharge absent any protection thereagainst. Accordingly, and as discussed below with reference to FIGS. 2 and 3A, the battery pack assembly 102 may include a BMS having a reverse bias protection circuit, where the BMS may be coupled to the plurality of lithium-ion battery cells and the electrical load. In this way, a MOSFET of the BMS may remain switched OFF during application of a reverse bias voltage such that degradation of individual battery cells and the BMS may be mitigated.

In some examples, the external housing 104 may be configured to expose a network management interface 110. In one example, the network management interface 110 may be communicatively coupled to a local interconnect network (LIN) 112 of the vehicle via a wired or wireless connection. Accordingly, in some examples, the network management interface 110 may include a physical connector for mating with a complementary connector affixed to a wire extending from a LIN bus.

In some examples, the external housing 104 may include a top cover 114a removably affixed to an enclosure base 114b. As such, the top cover 114a may be temporarily removed to replace or diagnose one or more of the plurality of lithium-ion battery cells.

Referring now to FIG. 1B, a schematic diagram 150 depicting a battery pack 152 is shown. In some examples, the battery pack 152 may be included in the battery pack assembly 102 of FIG. 1A, wherein the top cover 114a has been removed from the battery pack assembly 102, exposing a plurality of lithium-ion battery cells 154 removably affixed to the enclosure base 114b. Accordingly, it will be appreciated that each lithium-ion battery cell 154 may represent a fundamental unit from which a battery pack of arbitrary size, arbitrary power, and having an arbitrary number of lithium-ion battery cells 154 may be constructed. It will further be appreciated that other embodiments not depicted at FIG. 1B may include a battery pack having only one lithium-ion battery cell.

In some examples, the plurality of lithium-ion battery cells 154 may be arranged in a stacked configuration, where each of the plurality of lithium-ion battery cells 154 may be a prismatic pouch electrochemical cell. As such, each of the plurality of lithium-ion battery cells 154 may include a positive electrode and a negative electrode immersed in a liquid electrolyte, where each of the positive electrode, negative electrode, and electrolyte may be enclosed by a hermetically-sealed pouch.

Further, each of the plurality of lithium-ion battery cells 154 may expose a positive electrode tab 156 and a negative electrode tab 158, which may be configured to couple to the positive electrode and the negative electrode, respectively. Accordingly, each of the plurality of lithium-ion battery cells 154 may be electrically coupled to the positive terminal post 106 and the negative terminal post 108 described in detail above with reference to FIG. 1A. In some examples, the plurality of lithium-ion battery cells 154 may be electrically coupled to one another in series and/or in parallel by one or more busbars (not shown at FIG. 1B), whereby the one or more busbars may each be electrically coupled to a plurality of electrode tabs 156, 158 on multiple lithium-ion battery cells 154. The one or more busbars may further be electrically coupled to one of the terminal posts 106, 108, such that the plurality of lithium-ion battery cells 154 may be electrically coupled to the terminal posts 106, 108 and thereby provide power to a system, for example, a vehicle.

Each lithium-ion battery cell 154 of the battery pack 152 may be identical to one another. Further, each of a total number of lithium-ion battery cells 154 and an electrical coupling configuration (e.g., parallel count and series count) of the battery pack 152 may define electrical characteristics and performance ratings thereof. As an example, the battery pack 152 may be configured in a '4S4P' configuration which has 16 lithium-ion battery cells 154 in four subgroups, where the subgroups may be electrically coupled in series, and where four lithium-ion battery cells 154 in each subgroup may be electrically coupled in parallel. In some examples, the total number of lithium-ion battery cells 154 may be odd. In other examples, the total number of lithium-ion battery cells 154 may be even.

The plurality of lithium-ion battery cells 154 may be retained in the stacked configuration by bands 160. As shown, one or more bands 160 may circumscribe the plurality of lithium-ion battery cells 154 so as to prevent displacement of individual lithium-ion battery cells 154 relative to one another.

Figure 2:
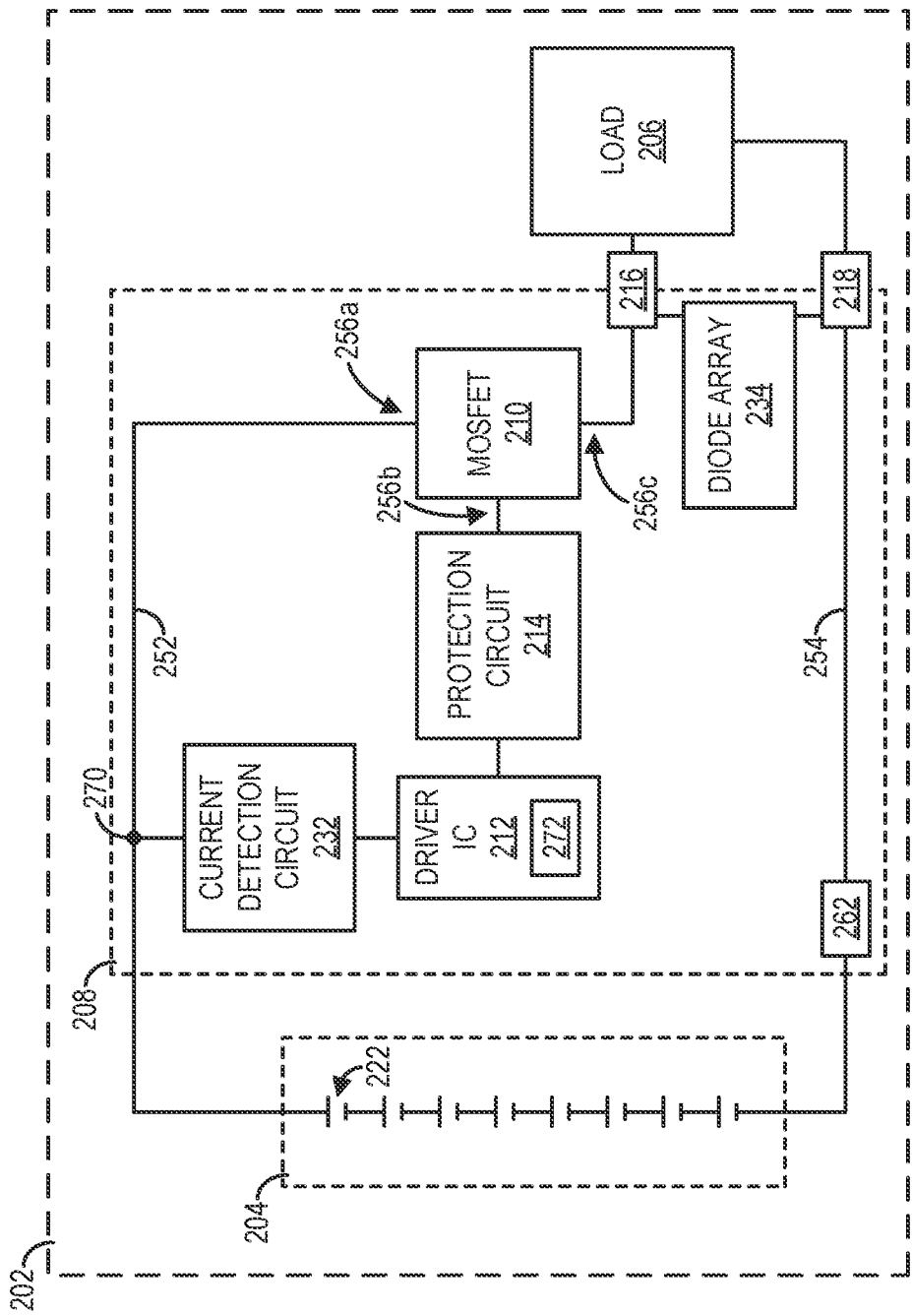
FIG. 2 shows a high-level block diagram of a vehicle battery system including a battery management system.
Figure 3A:
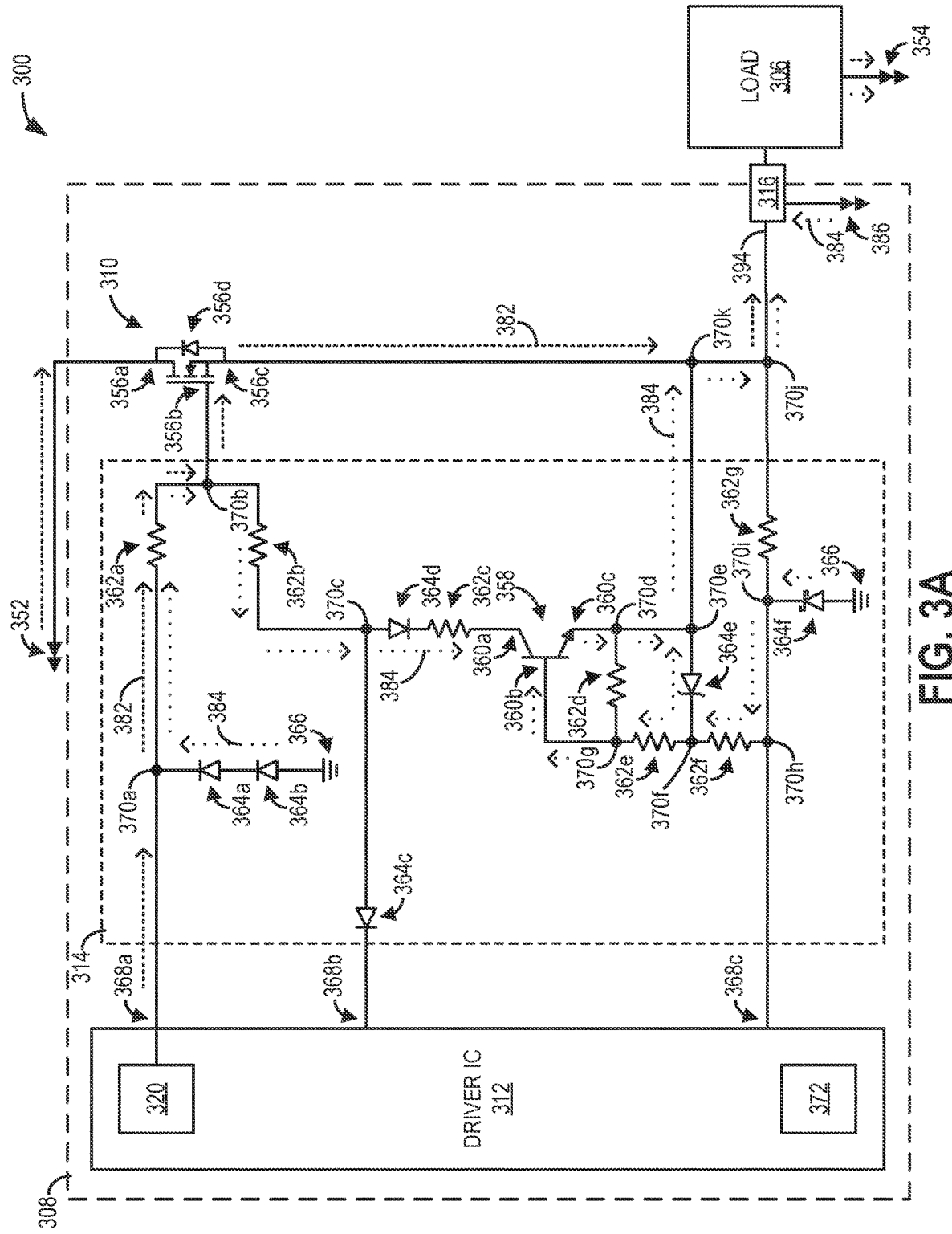
FIG. 3A shows a schematic diagram of circuitry of a reverse bias protection circuit included in the battery management system.
Figure 3B:
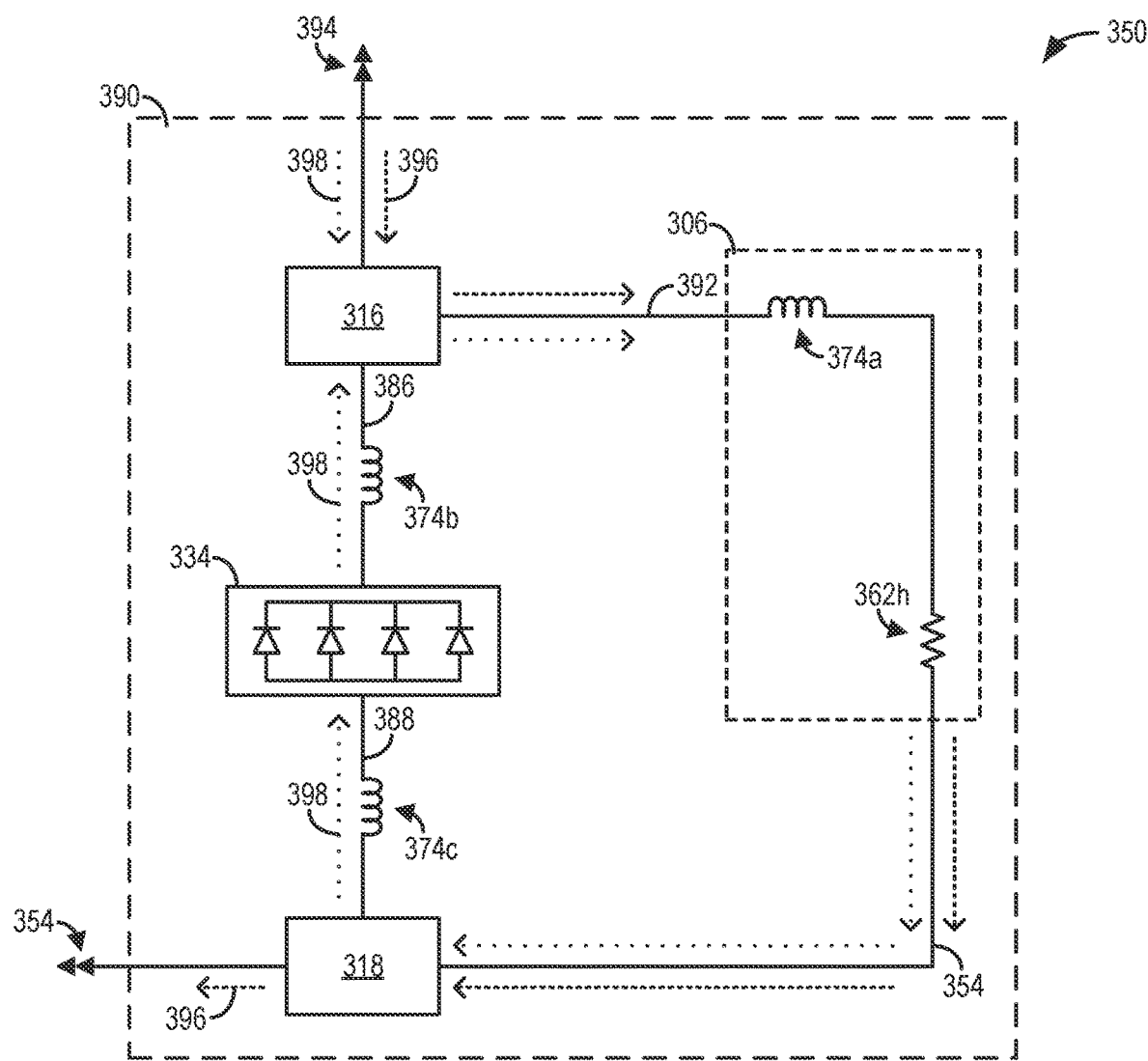
FIG. 3B shows a schematic diagram of circuitry of a short-circuit protection circuit.

Referring now to FIG. 2, a high-level block diagram 200 depicting a vehicle battery system 202 is shown. The vehicle battery system 202 may include a battery pack 204 (such as the battery pack 152 of FIG. 1B), the battery pack 204 including one or more lithium-ion battery cells 222. As shown, a positive supply line 252 may couple a positive end of the battery pack 204 to an electrical load 206 (for example, a belt integrated starter/generator, an integrated starter/generator, etc.) via a BMS 208, and a ground return line 254 may couple the electrical load 206 to a negative end of the battery pack 204. Specifically, the positive supply line 252 of the battery pack 204 may be coupled to an input 256a of a cutoff circuit 210, and an output 256c of the cutoff circuit 210 may be coupled to the electrical load 206. Further, a control input 256b of the cutoff circuit 210 may be coupled to a driver integrated circuit (IC) 212 of the BMS 208 via a protection circuit 214. Accordingly, the driver IC 212 may be communicably coupled to a controller 272, which may store machine readable instructions on a non-transitory storage device, the instructions executable by the controller 272 to enable various functionalities of the BMS 208, such as receiving and transmitting switching requests, monitoring the vehicle battery system 202, etc. For example, a current detection circuit 232 coupled to the positive supply line 252 via a node 270 may transmit measurements of currents passing to the cutoff circuit 210 to the controller 272, where the controller 272 may be enabled to generate switching requests and adjust battery system operating conditions in response to the measurements received thereat. It will be appreciated that, though the controller 272 is depicted in FIG. 2 as being included within the driver IC 212, in other examples, the controller 272 may be positioned external to the driver IC 212.

As further shown, a positive terminal post 216 may be coupled to a line coupling the BMS 208 to the electrical load 206 and a negative terminal post 218 may be coupled to a line (the ground return line 254) coupling the electrical load 206 to the battery pack 204 [additionally or alternatively, the positive and negative terminal posts 216, 218 may be coupled to the BMS 208 via respective busbars (not shown at FIG. 2)]. Accordingly, it will be appreciated that the electrical load 206 may be located external to the battery pack 204. A diode array 234 may further be coupled to each of the positive and negative terminal posts 216, 218, where anodes of each diode in the diode array 234 may be directly coupled to the negative terminal post 218 and cathodes of each diode in the diode array 234 may be directly coupled to the positive terminal post 216. A shunt resistor 262 may further be positioned along the ground return line 254 coupling the battery pack 204 to the negative terminal post 218.

The cutoff circuit 210 may be coupled to other components in the vehicle battery system 202 via the input 256a, the control input 256b, and the output 256c. As such, a voltage at the control input 256b relative to a voltage at the output 256c may control an operating state of the cutoff circuit 210. For example, if a relative voltage across the control input 256b and the output 256c is less than a threshold operating voltage, then the cutoff circuit 210 may be in an OFF state. Conversely, if the relative voltage across the control input 256b and the output 256c is greater than or equal to a threshold operating voltage, then the cutoff circuit 210 may be in an ON state. In this way, the cutoff circuit 210 may operate as a switch to selectively permit current flow from the input 256a to the output 256c depending on a voltage applied to the control input 256b.

The cutoff circuit 210 may include one or more of FETs, such as MOSFETs or JFETs, other types of transistors, or combinations thereof. In some examples, the cutoff circuit 210 may be a single MOSFET, such as an n-channel enhancement mode MOSFET, a p-channel enhancement mode MOSFET, etc. In such examples, the input 256a may be a drain terminal, the control input 256b may be a gate terminal, and the output 256c may be a source terminal. Accordingly, as an exemplary embodiment, operation of the cutoff circuit 210 may be described hereinbelow as operation of a MOSFET 210 having a drain terminal 256a, a gate terminal 256b, and a source terminal 256c.

Specifically, the MOSFET 210 may be in an OFF state at zero gate-source voltage ($V_{GS}$). Thus, switching the MOSFET 210 to an ON state may depend upon a voltage at the gate terminal 256b ($V_G$) relative to a voltage at the source terminal 256c ($V_S$), that is, the $V_{GS}$. If the $V_{GS}$ is higher than a $V_{th}$ of the MOSFET 210, then the MOSFET 210 may switch from the OFF state to the ON state. When in the ON state, the MOSFET 210 may permit current flow from the drain terminal 256a to the source terminal 256c. Conversely, when in the OFF state, the MOSFET 210 may prevent or restrict (e.g., substantially restrict) current flow therethrough.

During battery operation, a switch ON request may be received by the driver IC 212, and the $V_{GS}$ (greater than the $V_{th}$) may be output to switch the MOSFET 210 to the ON state. However, in some circumstances, the MOSFET 210 may be unintentionally switched from an OFF state to an ON state without any feedback from the driver IC 212. For example, a higher-current or short-circuit voltage profile may be generated by a reversed polarity event, by negative electric noise in the vehicle battery system 202, etc.

Specifically, an unintentional switching of the MOSFET 210 may result from any event which would generate a significant negative $V_S$, as a negative $V_S$ may result in a positive $V_{GS}$, as implied by equation (1):

$$V_{GS} = V_G - V_S \quad (1)$$

As just one example, if the $V_G$ is zero and the $V_S$ is a negative value, then the $V_{GS}$ is a positive value, and if the positive value of the $V_{GS}$ is greater than the $V_{th}$, then the MOSFET 210 may turn ON.

Accordingly, a protection circuit to maintain a MOSFET in an OFF state during an unexpected voltage spike in the vehicle battery system is provided herein. For example, the protection circuit 214 may be included in the BMS 208 to protect the MOSFET 210 from unintentional switch ON by dissipating energy accumulated in the vehicle battery system 202 during a short-circuit or higher-current situation. Accordingly, the protection circuit 214 may control the gate terminal 256b and the source terminal 256c of MOSFET 210 by maintaining the $V_G$ and the $V_S$ near, or substantially at, zero, such that a magnitude of the $V_{GS}$ may be maintained at a low value and may not exceed the $V_{th}$.

For a circuit that does not include a reverse bias protection circuit described herein, current at a charge pump included in the driver IC 212 may bleed out to compensate leakage current at the MOSFET 210 during reverse bias conditions. Accordingly, the vehicle battery system 202 may lose built-up charge at the charge pump, such that the driver IC 212 may not be able to effectively supply current to various parts of the vehicle battery system 202 (for example, to switch ON the MOSFET 210 when a switch ON request is actually received). Thus, when a sudden negative $V_S$ is generated at the MOSFET 210, current draining from the charge pump may be undesirably exacerbated.

In contrast, in the present disclosure, the protection circuit 214 prevents the charge pump from bleeding out once negative $V_S$ is detected above a threshold $V_S$. Specifically, and as discussed below in detail with reference to FIG. 3A, a current path may be provided in the protection circuit 214 via a pair of diodes in series to allow current to flow to the gate terminal 256b of the MOSFET 210.

To maintain the $V_{GS}$ less than the $V_{th}$, the protection circuit 214 may further include a switchable current path arranged between the gate terminal 256b and the source terminal 256c. The switchable current path may include a transistor or switching device, such as a BJT, which may, responsive to detecting an unexpected negative $V_S$, maintain down the $V_{GS}$ at the MOSFET 210 to maintain the MOSFET 210 in the OFF state. Thus, by reducing current drain at the charge pump and preventing the MOSFET 210 from turning ON absent any switch ON request, the protection circuit 214 may mitigate degradation of the BMS 208 and the one or more lithium-ion battery cells 220 in the battery pack 204, thereby allowing the BMS 208 to continue expected functionality, such as protecting the battery pack 204 from deep discharge.

In this way, the BMS 208 may be configured to flow current through the switchable current path of the protection circuit 214 upon detection of the reverse bias voltage at the output 256c of the cutoff circuit 210 (e.g., at the source terminal 256c of the MOSFET 210). The BMS 208 may further be configured to prevent current flow through the switchable current path in response to an absence of the reverse bias voltage at the output 256c of the cutoff circuit 210 (e.g., at the source terminal 256c of the MOSFET 210).

It will be appreciated that, though a single MOSFET 210 is depicted at FIG. 2, the BMS 208 may include an array of MOSFETs. Accordingly, aspects of the present disclosure may be applied to each MOSFET in the array of MOSFETs, such that each MOSFET in the array of MOSFETs may be protected from unexpected switch ON.

The BMS 208 may further be enabled to switch OFF the MOSFET 210 from a previously requested ON state. For example, during a short-circuit event, a voltage spike (e.g., a change in magnitude of voltage that exceeds a threshold voltage, a voltage greater than the voltage of the battery pack, etc.) may result in the electrical load 206 being partially bypassed, generating excess current which may be passed towards the MOSFET 210 along the positive supply line 252. Accordingly, to prevent the excess current from degrading the MOSFET 210, the current detection circuit 232 may be implemented to detect the excess current, enabling the driver IC 212 to execute a switch OFF request and open the MOSFET 210.

Accordingly, in one example, the current detection circuit 232 may be electrically coupled to the positive supply line 252 at the node 270. However, it will be appreciated that in other examples, the current detection circuit 232 may be coupled to other lines or components of the vehicle battery system 202, such as the ground return line 254. The current detection circuit 232 may further be communicably coupled to the driver IC 212 via the controller 272 included therein. The current detection circuit 232 may detect and obtain a measurement of a current passing through the node 270, whereby the measurement may be transmitted to the driver IC 212. Thereat, the controller 272 may generate the switching request for the driver IC 212. In this way, the BMS may protect the MOSFET and other components of the vehicle battery system from undesired currents that may result from short-circuit events.

In addition, it may be possible to reduce a possibility of a breakdown voltage of the MOSFET 210 being reached even when the MOSFET 210 is switched OFF. Specifically, less energy accumulated prior to, or during, a voltage spike may be passed to the MOSFET 210 so that the MOSFET 210 may not enter avalanche mode, risking degradation of the MOSFET 210. In the BMS 208, the diode array 234 may provide a low-resistance path for dissipation of the accumulated energy.

Specifically, the diode array 234 may include a plurality of flyback or freewheeling diodes, where anodes of each of the plurality of freewheeling diodes may be directly coupled to the negative terminal post 218 and cathodes of each of the plurality of freewheeling diodes may be directly coupled to the positive terminal post 216. When the MOSFET 210 is switched OFF in response to a short-circuit event, the positive terminal post 216 may have a lower potential thereat, such that the negative terminal post 218 may have a higher potential than the positive terminal post 216. Accordingly, when excess current accumulated at the electrical load 206 passes along the ground return line 254 to the negative terminal post 218, a potential difference generated between the positive and negative terminal posts 216, 218 may draw the current across the diode array 234. Due to the potential difference generated upon switching OFF of the MOSFET 210, it will be appreciated that the current may begin flowing across the diode array 234 substantially immediately following switching OFF of the MOSFET 210. Specifically, the plurality of freewheeling diodes may by characterized a fast forward response time, resulting in the low-resistance path. As shown, the shunt resistor 262 may be implemented to further direct the current across the low-resistance path provided by the diode array 234.

Since the MOSFET 210 may be maintained OFF by the protection circuit 214, the current passed across the diode array 234 may further be passed across the electrical load 206 to be received again at the negative terminal post 218. In this way, excess current may cycle across each of the electrical load and the diode array. As the current cycles, energy may dissipate from the vehicle battery system 202 (for example, via heat) until the (gradually attenuating inductive) current is reduced below a threshold current manageable by the MOSFET 210. Thereafter, the driver IC 212 may be enabled to switch the MOSFET 210 ON again in response to a switch ON request being generated by the controller 272, an external controller, or an operator of the vehicle battery system 202. However, it will be appreciated that the low-resistance path provided by the diode array 234 may permit current to cycle thereacross whenever the MOSFET 210 is switched OFF. That is, in some examples, the low-resistance path may cycle and dissipate currents of up to 1700 A whenever the MOSFET 210 is switched OFF. For example, the low-resistance path may cycle and dissipate a current of 200-300 A when the vehicle battery system 202 is powered down as expected and a current of greater than 1000 A during and following a short-circuit event. In this way, the diode array may redirect and dissipate accumulated energy when the vehicle battery system is powered down, whether the BMS switches OFF the MOSFET in response to an operator request or a short-circuit event.

Referring now to FIG. 3A, a schematic diagram 300 depicting circuitry of one example of a reverse bias protection circuit 314 included in a BMS 308 is shown. In some examples, one or more components described with reference to FIG. 3A may be substituted into the vehicle battery system 202 described above with reference to FIG. 2. For example, the BMS 208 of FIG. 2 and the BMS 308 of FIG. 3A may be the same or equivalent circuits. The component numbers in the circuit of FIG. 3A are made to conform with their incorporation into FIG. 3A.

As shown in FIG. 3A, the BMS 308 may further include a cutoff circuit 310 (e.g., MOSFET or other known transistor) and a driver IC 312, each being coupled to the reverse bias protection circuit 314. The MOSFET 310 may include a drain terminal 356*a* (input), a gate terminal 356*b* (control input, which may control the operating state of MOSFET 310), and a source terminal 356*c* (output). The drain terminal or input 356*a* may be directly coupled to a positive terminal of a battery pack (not shown in FIG. 3A) via a positive supply line 352. The gate terminal or control input 356*b* may be coupled to the driver IC 312 by way of the reverse bias protection circuit 314. The source terminal or output 356*c* may be directly coupled to the reverse bias protection circuit 314. The source terminal 356*c* may further be directly coupled to a positive battery output terminal 316 (also referred to herein as positive terminal 316), and the positive terminal 316 is directly coupled to an (external) electrical load 306. The electrical load 306 may also be directly coupled to a negative battery output terminal of the battery pack via a ground return line 354. It will be appreciated that the electrical load 306 may be located external to the battery pack (that is, the electrical load 306 may not be part of the battery pack). As further shown, various junctions of two or more electrical conductors or wires may be respectively represented by nodes 370*a*, 370*b*, 370*c*, 370*d*, 370*e*, 370*f*, 370*g*, 370*h*, 370*i*, 370*j*, and 370*k*. Dashed directional arrows 382 depict exemplary current flow during expected switching ON of the MOSFET 310 during normal circuit operation, as described hereinbelow. That is, the directional arrows 382 depict exemplary current flow when the MOSFET 310 is in an ON state and a low-current leakage transistor 358 of the reverse bias protection circuit 314 is in the OFF state when reverse bias at the positive terminal 316 is not present.

The MOSFET 310 may further include a body diode 356*d*. In some circumstances, for example, during a reversed polarity event or when significant negative electric noise has built up in the battery system and the reverse bias protection circuit 314 is not present, a reverse bias voltage may be applied across the body diode 356*d* when the MOSFET 310 is in an OFF state. The body diode 356*d* may then be triggered, unexpectedly switching the MOSFET 310 from the OFF state to an ON state.

During such events where the reverse bias voltage is applied and the reverse bias protection circuit 314 is not present, a higher-current profile may develop in the battery system. Accordingly, a significant amount of energy may accumulate, and the accumulated energy may dissipate via a weakest (that is, least resistant) channel in the battery system. For example, absent the reverse bias protection circuit 314, a higher current may pass through the body diode 356*d* to ground, thus overloading the MOSFET 310. Thus, the reverse bias protection circuit 314 is provided herein for controlling such higher currents. As discussed in detail below, and as exemplified above with reference to FIG. 2, the reverse bias protection circuit 314 may protect MOSFET 310 from the reverse bias voltage by maintaining each of a $V_G$ and a $V_S$ of the MOSFET 310 near, or substantially at, 0 V. Accordingly, dotted directional arrows 384 depict exemplary current flow during reverse bias voltage conditions, wherein current may be redirected through the reverse bias protection circuit 314, as described hereinbelow. That is, the directional arrows 384 depict exemplary current flow when the MOSFET 310 is in an OFF state and the low-current leakage transistor 358 of the reverse bias protection circuit 314 is in the ON state. Thus, a current path is shown beginning at ground 366 and it passes through diodes 364*a* and 364*b*, through resistors 362*a* and 362*b*, through diode 364*d*, through resistor 362*c*, through transistor 358, through node 370*e*, and ending at the electrical load 306.

As shown, the driver IC 312 may be provided with three pins 368*a*, 368*b*, and 368*c*, such that timing of outputs therefrom may be varied. Specifically, the pin 368*a* may be employed to turn ON the MOSFET 310, the pin 368*b* may be employed to turn OFF the MOSFET 310, and the pin 368*c* may be employed as a reference pin for controlling a $V_{GS}$ of the MOSFET 310. As such, the pin 368*a* may provide a voltage (for example, 5 V) that may be delivered to the gate terminal 356*b* of the MOSFET 310 to switch the MOSFET 310 ON, the pin 368*b* may pull the $V_G$ to ground, and the pin 368*c* may be coupled to the source terminal 356*c* of the MOSFET 310 to reference the $V_S$. In some examples, a switching mechanism of the pin 368*a* may be slower than a switching mechanism of the 368*b*. That is, a resistance of a resistor 362*a* coupling between the pin 368*a* and the MOSFET 310 may be higher than a resistance of a resistor 362*b* coupling between the pin 368*b* and the MOSFET 310.

Absent the reverse bias protection circuit 314, when significant negative $V_S$ is applied, the $V_{GS}$ may increase to a positive value above a $V_{th}$ of the MOSFET 310. However, the reverse bias protection circuit 314 may protect the MOSFET 310 by maintaining the $V_G$ and the $V_S$ near, or substantially at, 0 V, thereby maintaining an OFF state of the MOSFET 310. Two principal features of the reverse bias protection circuit 314 may be provided to protect various components of the BMS 308, and thereby of the battery system as a whole: diodes 364*a*, 364*b*, and 364*f* to feed current from ground 366, and the low-current leakage transistor 358 to maintain the $V_{GS}$ of the MOSFET 310 below the $V_{th}$ (as shown by the directional arrows 384).

For example, when the reverse bias voltage is applied, the diode 364*f* may prevent excess current from draining from the pin 368*c* to the source terminal 356*c* of the MOSFET 310 via a resistor 362*g* coupled therebetween. Specifically, the current may instead be fed from ground 366 via the diode 364*f*, as shown by the directional arrows 384. As shown, in some examples, the diode 364*f* may be a Schottky diode, as Schottky diodes may have a relatively low forward voltage drop, such that the diode 364*f* may be closer to ground 366. Further, configuring the diode 364*f* to be oriented as shown may block current from flowing back to ground 366 when the MOSFET 310 controllably switched to the ON state. Additionally, resistors 362*f* and 362*g* may be provided in parallel to limit current flow from the pin 368*c*, maintaining a voltage of the pin 368*c* near zero when the negative $V_S$ is detected and near a reference value during expected battery operation. When the MOSFET 310 is OFF, due to the inductive feature of the electrical load 306, current may continue to flow through the positive terminal 316 to the electrical load 306. Accordingly, the node 370*j* may have a negative voltage. In order to sustain the current flow to the electrical load 306 and not drain current from the pin 368*c*, the diode 364*f* and the node 370*i* are provided to form a new circuit path to provide the current to the electrical load 306.

Similarly, and as further shown, the diodes 364*a* and 364*b* may be coupled in series to prevent excess current from draining from the charge pump 320 within the driver IC 312 to the gate terminal 356*b* of the MOSFET 310 via the pin 368*a* and the resistor 362*a* coupled therebetween. Specifically, a current may instead be fed from ground 366 via the diodes 364*a* and 364*b* when a negative $V_S$ is unexpectedly detected, as shown by the directional arrows 384. As such, the diodes 364*a* and 364*b* may be low-leakage diodes, providing low leakage current during unexpected battery operation. In this way, a controllability of the battery system by the driver IC 312, and thereby the BMS 308, may be protected. Further, configuring the diodes 364*a* and 364*b* to be oriented as shown may block current from flowing back to ground 366 when the current is provided by the charge pump 320 in response to a switch ON request at the driver IC 312, as shown by the directional arrows 382.

In some examples, and as further shown, the driver IC 312 may be communicably coupled to a controller 372, which may store machine readable instructions on a non-transitory storage device, the instructions executable by the controller 372 to enable various functionalities of the BMS 308, such as receiving and transmitting switching requests, monitoring the battery system, etc. It will be appreciated that, though the controller 372 is depicted in FIG. 3A as being included within the driver IC 312, in other examples, the controller 372 may be positioned external to the driver IC 312.

When a reverse bias voltage, that is, a negative $V_S$, is detected at the source terminal 356*c* of the MOSFET 310, a generated current may be fed towards node 370*f* and the low-current leakage transistor 358 from ground 366 through the diode 364*f* (for example, via the resistor 362*o*). In some examples, the diode 364*e* may be a Zener diode or a transient-voltage suppression (TVS) diode, such that the diode 364*e* may clamp a voltage thereacross at a set value, such as 8.5 V.

In some examples, the low-current leakage transistor 358 may be a BJT including an input (e.g., collector) terminal 360*a*, a control input (e.g., base) terminal 360*b*, and an output (e.g., emitter) terminal 360c. A voltage of approximately 8.5 volts relative to the source voltage $V_S$ may be generated at node 370f via diode 364e, this voltage may be lowered via a voltage divider formed by resistors 362e and 362d allowing current to flow into the base terminal 360b, thereby switching transistor 358 from an OFF state to an ON state.

As shown, an anode of the diode 364e may be coupled to the emitter terminal 360c and a cathode of the diode 364e may be directly coupled to the node 370f. As such, the anode of the diode 364e may be a higher voltage than that of the emitter terminal 360c, and the diode 364e may function to stabilize a base-emitter voltage ($V_{BE}$) of the low-current leakage transistor 358.

Accordingly, when the negative $V_S$ is unexpectedly generated, the low-current leakage transistor 358 may switch ON via the negative $V_S$ increasing the $V_{BE}$ thereof. Thus, the low-current leakage transistor 358 may be considered a switch that allows current to flow from diodes 364a and 364b toward the source terminal 356c as indicated by the directional arrows 384. The current may flow through resistor 362a to resistor 362b, then to diode 364d, then to resistor 362c, then through transistor 358 before reaching node 370k, which is directly coupled to the source terminal 356c. The current flow allows $V_G$ to approach $V_S$, thereby preventing MOSFET 310 from switching ON.

Specifically, once the low-current leakage transistor 358 is ON, the $V_G$ of the MOSFET 310 may be quickly dragged down to an emitter voltage (VE) of the low-current leakage transistor 358. Since the emitter terminal 360c may be coupled to the source terminal 356c of the MOSFET 310, the $V_{GS}$ of the MOSFET 310 may be maintained via a $V_{CE}$ of the low-current leakage transistor 358. Accordingly, when the $V_{CE}$ drops across the collector terminal 360a and the emitter terminal 360c, for example, to less than 1 V, the $V_{GS}$ may be maintained at a value less than the $V_{th}$, and the MOSFET 310 may remain in the OFF state.

On the other hand, during expected battery operation, the low-current leakage transistor 358 may be switched OFF, and the pin 368a may supply voltage to raise $V_G$ of the MOSFET 310 to switch MOSFET 310 ON. Electric current may flow from the drain terminal 356a to the source terminal 356c and to the electrical load 306 when MOSFET 310 is switched ON. MOSFET 310 may be switched OFF via pin 368b. Electric current flow from the drain terminal 356a to the source terminal 356c may be prevented when MOSFET 310 is switched to ON. In this way, a switchable current path including the low-current leakage transistor 358 may be electrically coupled to the MOSFET 310, the switchable current path being arranged between the gate terminal 356b of the MOSFET 310 and the source terminal 356c of the MOSFET 310.

In some examples, diodes 364c and 364d may further be provided as blocking diodes to maintain a direction of current flow to the driver IC 312 via the pin 368b and to the low-current leakage transistor 358 via the resistor 362c, respectively. Accordingly, and as shown, the diode 364c may be oriented in a desired direction of current being passed to the driver IC 312 via the pin 368b when the MOSFET 310 is controllably switched OFF, and the diode 364d may be oriented in a desired direction of current being passed to the low-current leakage transistor 358 via the resistor 362c to protect the MOSFET 310 from an unexpected reverse bias voltage passed to the source terminal 356c. In one example, each of the diodes 364c and 364d may be a diode with a relatively low forward voltage drop, such as a Schottky diode.

In this way, a current may flow from the nodes 370b and 370c coupled to the gate terminal 356b of the MOSFET 310 to the nodes 370d and 370e coupled to the source terminal 356c of the MOSFET 310 in response to a negative $V_S$ being applied to the node 370e while current flow across the gate terminal 356b to the source terminal 356c is prevented. Thus, a negative voltage at the source terminal 356c may prevent the MOSFET 310 from turning ON. Such current flow may be enabled by activating the low-current leakage transistor 358 disposed between the nodes 370b and 370c and the nodes 370d and 370e. In some examples, the current may flow from ground 366 through the diodes 364a and 364b to the nodes 370b and 370c. However, the current may not flow from the nodes 370b and 370c to the nodes 370d and 370e in response to an absence of the negative $V_S$ being applied to the node 370e.

In some examples, the circuitry depicted by schematic diagram 300 may be implemented in a vehicle battery system to prevent turn ON of the MOSFET 310 even when a switch ON request is received. As an example, the MOSFET 310 may be one of a plurality of MOSFETs arranged in an array. Each of the MOSFETs 310 may be electrically coupled to one of a plurality of lithium-ion battery cells in the battery pack. In some examples, when a switch ON request is received, a portion of the lithium-ion battery cells may be utilized to provide power to the vehicle battery system, and a remaining portion may be kept OFF by the reverse bias protection circuit 314.

As shown by the directional arrows 382 and 384, whether the MOSFET 310 is switched ON or switched OFF in response to the negative $V_S$ being applied to the node 370e, the current may pass along a line 394 and across each of the positive terminal 316 and the electrical load 306 to the ground return line 354, wherefrom the current may be cycled back along a line 386. As further described below with reference to FIG. 3B, each of the ground return line 354 and the line 386 may be coupled to a diode array. Specifically, the diode array may form, with the electrical load 306, a short-circuit protection circuit which may cycle and dissipate accumulated current in the vehicle battery system when the MOSFET 310 is maintained OFF by the reverse bias protection circuit 314.

Referring now to FIG. 3B, a schematic diagram 350 depicting circuitry of one example of a short-circuit protection circuit 390 is shown. It will be appreciated that components of the short-circuit protection circuit 390 may be included in, or coupled to, the BMS 308 described above with reference to FIG. 3A. Accordingly, in some examples, one or more components described with reference to FIG. 3B may be substituted into the vehicle battery system described above with reference to FIG. 2. The component numbers in the circuit of FIG. 3B are made to conform with their incorporation into FIG. 3B.

As shown in FIG. 3B, the short-circuit protection circuit 390 may include a diode array 334. The diode array 334 may be an array of flyback or freewheeling diodes arranged in parallel. As shown, anodes of all diodes in the diode array 334 may be directly coupled together and cathodes of all diodes in the diode array 334 may be directly coupled together. Though four individual diodes are shown in the schematic diagram 350 as being included within the diode array 334, it will be appreciated that FIG. 3B depicts an exemplary embodiment, and should be understood as non-limiting. Accordingly, a total number of diodes in the diode array 334 may be less than, equal to, or greater than four.

The electrical load 306, characterized by an inductance 374a and a resistance 362h, may be coupled to the diode array via the positive battery output terminal 316 and a negative battery output terminal 318 (also referred to herein as negative terminal 318). Specifically, the diode array 334 may be electrically coupled to the positive terminal 316 via a line 386 and the negative terminal 318 via a line 388. Further, the electrical load 306 may be coupled to the positive terminal 316 via a line 392 and the negative terminal 318 via the ground return line 354, such that the short-circuit protection circuit 390 may be formed between the diode array 334 and the electrical load 306.

Dashed directional arrows 396 depict exemplary current flow following expected switching ON of the MOSFET 310 (described above with reference to FIG. 3A) during normal circuit operation. Specifically, a current may flow from the source terminal 356c (described above with reference to FIG. 3A) of the MOSFET 310 to the positive terminal 316 via the line 394, wherefrom the current may flow across the electrical load 306 to power a battery-powered system. From the electrical load 306, the current may flow along the ground return line 354 from the electrical load 306 to the negative terminal 318 and on to a battery pack (not shown at FIG. 3B). In this way, during normal circuit operation, a closed circuit may be formed between the battery pack, the MOSFET, and the electrical load.

Dotted directional arrows 398 depict exemplary current flow during a short-circuit condition, where the MOSFET 310 (described above with reference to FIG. 3A) is opened or turned OFF. During such conditions, the current may not flow to the battery pack, and may instead cycle across the electrical load 306 and the diode array 334. That is, the directional arrows 398 depict current flow when the MOSFET 310 is maintained in an OFF state by the reverse bias protection circuit 314 (described above with reference to FIG. 3A). The current may flow from the reverse bias protection circuit 314 to the positive terminal 316 via the line 394, wherefrom the current may flow to the electrical load 306. Specifically, the current may flow from ground 366 to a lower voltage that forms at the positive terminal 316. The lower voltage may be generated when the MOSFET 310 is opened. For example, when the MOSFET 310 is opened to cease current flow to the electrical load 306, the inductance 374a attempts to maintain current flow via inducing a voltage opposite in polarity to the voltage of the positive and negative terminals 316, 318 when the MOSFET 310 is closed or ON. From the electrical load 306, the current may flow along the ground return line 354 to the negative terminal 318.

Because the inductance 374a of the electrical load 306 attempts to maintain the current flow via inducing the voltage that is opposite in polarity, the diode array 334 becomes forward biased, thereby allowing the current flow from the negative terminal 318 to the positive terminal 316. Thus, in response to the short-circuit condition, a low-resistance path may be provided by the diode array 334, which may recirculate excess current within the electrical load 306. In this way, by coupling the source terminal of the MOSFET to the short-circuit protection circuit including the array of freewheeling diodes, the positive terminal, the electrical load, and the negative terminal, the MOSFET may be protected from degradation (for example, due to entering avalanche mode when the MOSFET is conducted in an OFF state), as the excess current may be redirected by the short-circuit protection circuit.

As further shown, the lines 386, 388 may be respectively characterized by parasitic inductances 374b, 374c. As described in detail below with reference to FIG. 6, the parasitic inductances 374b, 374c may be at least partially mitigated via busbars (not shown at FIG. 3B) respectively coupling the positive terminal 316 to the line 386 and the negative terminal 318 to the line 388. Accordingly, by reducing the parasitic inductances 374b, 374c via the busbars, the current may more easily be redirected along the directional arrows 398 and across the diode array 334. In some examples, a shunt resistor (not shown at FIG. 3B) may further be disposed along the ground return line 354 between the battery pack and the negative terminal 318 to further aid in redirecting the current along the directional arrows 398 and across the diode array 334.

Figure 4:
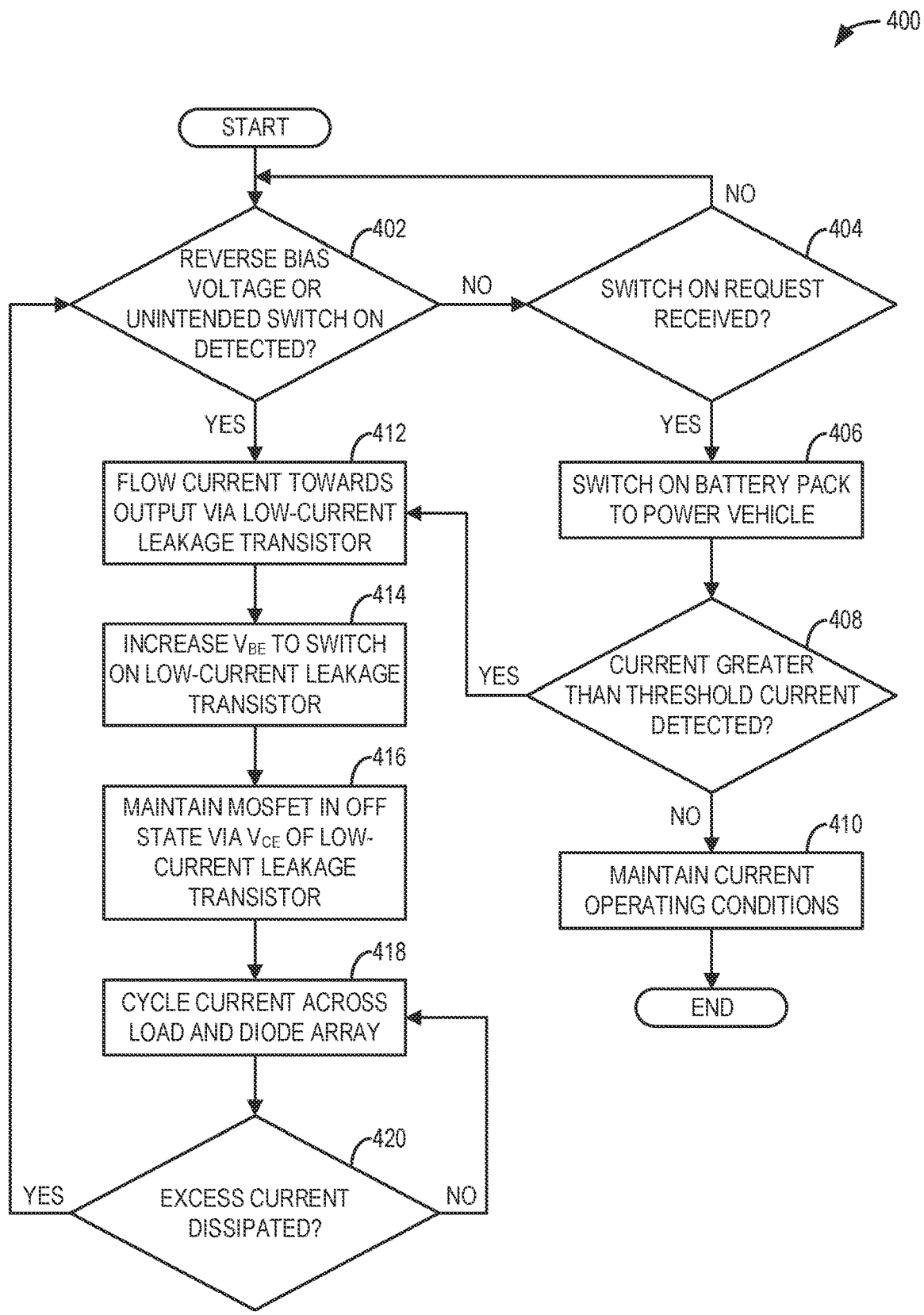
FIG. 4 shows a flow chart of a method for managing current flow during a reverse bias voltage condition.

Referring now to FIG. 4, a flow chart depicting a method 400 for providing reverse bias and short-circuit protection to a battery cutoff circuit is shown. The reverse bias and short-circuit protection may be provided via the circuitry illustrated in FIGS. 2-3B. In general, during application of a reverse bias voltage in a vehicle battery system, such as due to an unintentional reversed polarity event or built-up negative electric noise, the cutoff circuit may be at risk of unintentional switch-on. In specific examples where the cutoff circuit is a MOSFET, if a $V_{GS}$ of the MOSFET increases above a $V_{th}$ of the MOSFET (for example, via a sufficiently negative $V_S$), then the MOSFET may unintentionally switch ON, potentially discharging and degrading the vehicle battery system. Further, even when the MOSFET is switched OFF, the MOSFET may still be conducting if a breakdown voltage thereof is reached due to a short-circuit condition and the MOSFET may enter avalanche mode, potentially degrading the MOSFET and thereby the vehicle battery system. Accordingly, the method provided herein may detect the short-circuit condition, switch the MOSFET OFF, confirm that the MOSFET is OFF by flowing current through a reverse bias protection circuit, and dissipate accumulated energy through a short-circuit protection circuit.

Method 400 is described below with regard to the systems and components depicted in FIGS. 1A-3B. For example, in some examples, method 400 may be implemented in the BMS 208 of FIG. 2 or the BMS 308 of FIG. 3A (and FIG. 3B). In such examples, steps of method 400, or a portion thereof, may represent actions taken via hardware devices, such as one or more components of the BMS 208 or the BMS 308, in the physical world. It will be appreciated that method 400 may be implemented with other systems and components without departing from the scope of the present disclosure. It will further be appreciated that individual steps discussed with reference to method 400 may be added, removed, substituted, or interchanged within the scope of the present disclosure.

Method 400 may begin at 402 of FIG. 4, where method 400 may include responding to detection of a reverse bias voltage at a positive battery terminal or to unintended switch ON of the cutoff circuit. If the reverse bias voltage or unintended switch ON is not detected, desired battery operation may proceed. Specifically, method 400 may proceed to 404, where method 400 may include determining whether a switch ON request is received at the driver IC or at a controller coupled to the driver IC. Specifically, the switch ON request may be a command to switch the cutoff circuit of the BMS from an OFF state to an ON state. If the switch ON request is not received, method 400 may return to 402.

If the switch ON request is received, method 400 may proceed to 406, where method 400 may include turning ON a battery pack to power a vehicle by switching ON the cutoff circuit of the BMS and closing a battery circuit of the vehicle battery system. Specifically, a positive supply line may provide power from the battery pack to an (external) electrical load of the vehicle. However, it will be appreciated that the reverse bias protection circuit may mitigate degradation to the vehicle battery system even when the switch ON request is received, for example, when negative electric noise builds up in the vehicle battery system.

At 408, method 400 may include determining whether a current detected by a current detection circuit of the BMS is greater than a threshold current. In some examples, the threshold current may be selected to maintain an expected lifetime of the cutoff circuit. Specifically, the threshold current may be less than or equal to a maximum current manageable by the cutoff circuit without excess degradation thereto (e.g., degradation beyond expected degradation resulting from normal battery operation over a lifetime of the cutoff circuit). In some examples, the current may be a first current flowing along the positive supply line between the battery pack and the cutoff circuit.

If the detected current is determined to be less than or equal to the threshold current, method 400 may proceed to 410 to maintain current vehicle battery system operating conditions. Specifically, the vehicle battery system may continue to provide power to the vehicle until a switch OFF request is received. Method 400 may then end.

If the detected current is determined to be greater than the threshold current at 408, or if the reverse bias voltage or unintended switch ON is detected at 402, protection of battery operation may proceed. In particular, the reverse bias protection circuit may prevent the cutoff circuit from coupling the battery cells to the electrical load, thereby mitigating degradation to the vehicle battery system. Further, the short-circuit protection circuit may cycle and dissipate accumulated energy across the external load to further mitigate degradation to the vehicle battery system by preventing the cutoff circuit from reaching the breakdown voltage.

Method 400 may proceed to 412, where method 400 may include feeding a current (for example, a second current from ground) towards the output of the cutoff circuit via a low-current leakage transistor in the reverse bias protection circuit. In some examples, the low-current leakage transistor may be a BJT and the cutoff circuit may be a MOSFET, such that a collector terminal thereof may be coupled to a gate terminal (control input) of the MOSFET and an emitter terminal thereof may be coupled to the source terminal (output) of the MOSFET. The emitter terminal of the low-current leakage transistor may further be coupled to an anode of a Zener diode, and a base terminal of the low-current leakage transistor may be coupled to a cathode of the Zener diode. In other examples, a TVS diode may be employed.

At 414, method 400 may include increasing a $V_{BE}$ of the low-current leakage transistor via the Zener diode to switch ON the low-current leakage transistor. Further, by respectively coupling the cathode and the anode of the Zener diode to the base terminal and the emitter terminal of the low-current leakage transistor, the $V_{BE}$ may be clamped to a set value, for example, less than 8.5 V.

At 416, method 400 may include maintaining the cutoff circuit in the OFF state via reducing a WE of the low-current leakage transistor. Specifically, once the low-current leakage transistor is switched ON, a voltage across the collector and emitter terminals (that is, the WE) may decrease to and be maintained at a low value, for example, less than 1 V. Accordingly, by coupling the control input of the cutoff circuit to the collector terminal of the low-current leakage transistor and the output of the cutoff circuit to the emitter terminal of the low-current leakage transistor, a voltage difference between the control input of the cutoff circuit and the output of the cutoff circuit may be correspondingly maintained. In examples wherein the cutoff circuit is a MOSFET, the gate terminal of the MOSFET may be coupled to the collector terminal of the low-current leakage transistor, and the source terminal of the MOSFET may be coupled to the emitter terminal of the low-current leakage transistor. The $V_{GS}$ may be maintained via activating a transistor. In this way, the $V_{GS}$ may be maintained below a $V_{th}$ of the MOSFET, such that the MOSFET may be maintained in the OFF state.

At 418, method 400 may include cycling the current (for example, each of the first and second currents) across the external load and a diode array in the short-circuit protection circuit. Specifically, the emitter terminal of the low-current leakage transistor may further be coupled to the diode array, where the diode array may include a plurality of flyback or freewheeling diodes to provide a low-resistance path for redirecting the current away from the drain terminal of the MOSFET.

At 420, method 400 may include determining whether an excess current has dissipated. In one example, the excess current may be an amount of current in the vehicle battery system exceeding the threshold current. If the excess current has not dissipated, method 400 may return to 418. If the excess current has dissipated, method 400 may return to 402. It will be appreciated that, even when the excess current has dissipated, the current may continue to cycle across the external load and the diode array until a switch ON request is received (for example, at 404).

Figure 5A:
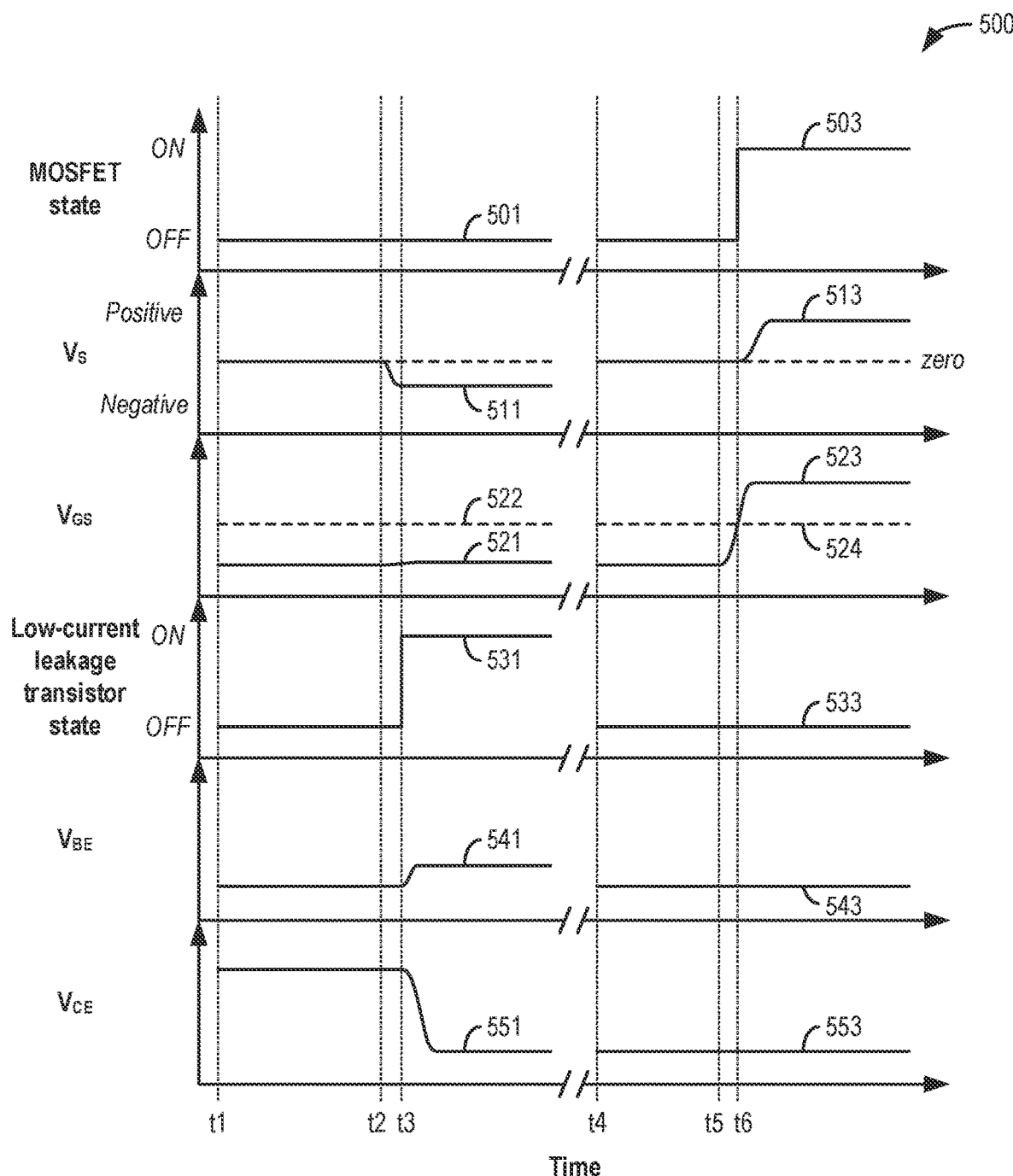
FIG. 5A shows first and second example operating sequences for the BMS.
Figure 6:
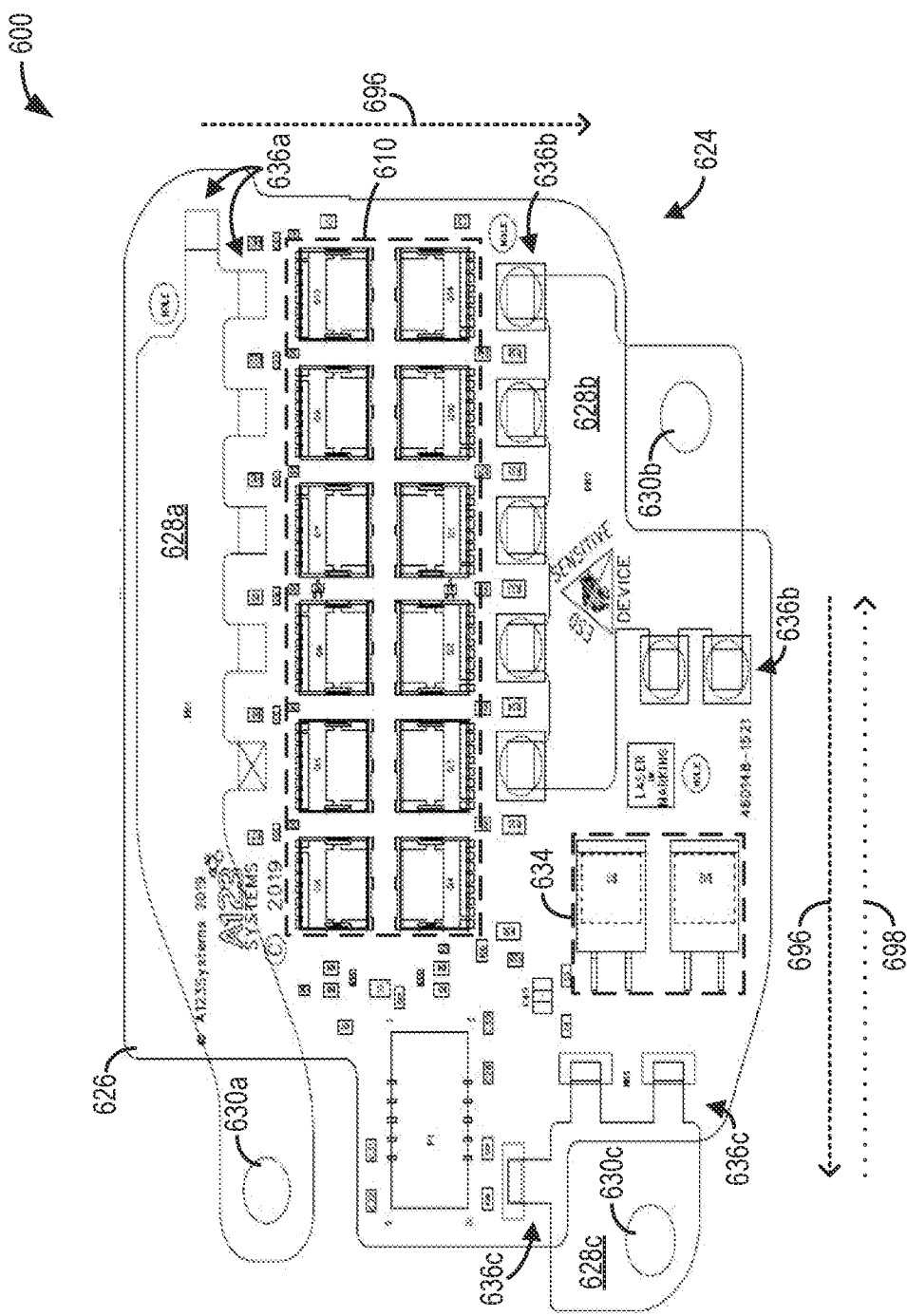
FIG. 6 shows a schematic diagram of an exemplary printed circuit board assembly for implementing the battery management system.

Referring now to FIG. 5A, a timeline 500 depicting first and second example operating sequences of the vehicle battery system of FIGS. 1A-3B is shown. Specifically, the vehicle battery system may be configured with one or more cutoff circuits, such as one or more MOSFETs, coupled to one or more protection circuits. A given cutoff circuit may switch ON responsive to a switch ON request received by the vehicle battery system, which may allow current to flow through the given cutoff circuit to power a vehicle in which the vehicle battery system may be implemented. However, in some examples, the given cutoff circuit may be in an OFF state when a reverse bias voltage is applied to an output of the given cutoff circuit. In such examples, a protection circuit coupled to the given cutoff circuit may include a low-current leakage transistor, such as a bipolar junction transistor (BJT). When switched ON, the low-current leakage transistor may be configured to maintain a voltage applied across a control input and an output of the given cutoff circuit, such that the given cutoff circuit is not unintentionally switched ON. In this way, the protection circuit may mitigate degradation to the vehicle battery system by reducing a possibility of unintentional activation of the cutoff circuitry. In some examples, the vehicle battery system may include the BMS 208 or the BMS 308 respectively described above with reference to FIGS. 2 and 3A.

Timeline 500 depicts a cutoff circuit state at solid curves 501 and 503, a voltage applied to the output (e.g., source) of the cutoff circuit at solid curves 511 and 513, a voltage difference between the control input of the cutoff circuit and the output of the cutoff circuit at solid curves 521 and 523, a low-current leakage transistor state at solid curves 531 and 533, a $V_{BE}$ of the low-current leakage transistor at solid curves 541 and 543, and a $V_{CE}$ of the low-current leakage transistor at solid curves 551 and 553. Additionally, dashed curves 522 and 524 represent a first threshold voltage for the voltage applied across the control input and the output at which the cutoff circuit state may switch between an OFF state and an ON state. It will be appreciated that, when the cutoff circuit includes a MOSFET, the voltage applied to the output (curves 511 and 513) may be a $V_S$ of the MOSFET, the voltage difference across the control input and the output (curves 521 and 523) may be a $V_{GS}$ of the MOSFET, and the first threshold voltage (curves 522 and 524) may be a $V_{th}$ of the MOSFET.

All curves are depicted over time and plotted along an abscissa, where time increases from left to right of the abscissa. Further, a dependent variable represented by each curve discussed above is plotted along a respective ordinate, where the dependent variable increases from bottom to top of the given ordinate (unless otherwise stated or shown).

At t1, the first example operating sequence of the vehicle battery system may begin. Between t1 and t2, each of the cutoff circuit state (curve 501) and the low-current leakage transistor state (curve 531) may be an OFF state. At t2, a negative voltage may be detected at the output of the cutoff circuit (curve 511), for example, due to a reverse bias voltage condition. In response to the negative voltage being detected at the output, a current may be redirected to a Zener diode (or a TVS diode) coupled to the low-current leakage transistor.

At t3, the low-current leakage transistor may switch from the OFF state to the ON state (curve 531). The current may thus flow through the low-current leakage transistor instead of the cutoff circuit, as the low-current leakage transistor may be coupled to a current path of lower resistance than the cutoff circuit.

Accordingly, after t3, the WE may decrease significantly from a first value to a second value and then be maintained at the second value (curve 551). For example, the WE may decrease from about 12 V to less than 1 V (e.g., near, or substantially at, 0 V) and then be maintained thereat. Further, the $V_{BE}$ may increase and level off at a value less than a value clamped by the Zener diode (curve 541). For example, $V_{BE}$ may increase to about 0.7 V. Moreover, in the vehicle battery system corresponding to the depicted example, the control input of the cutoff circuit may be coupled to a collector terminal of the low-current leakage transistor, and the output of the cutoff circuit may be coupled to an emitter terminal of the low-current leakage transistor. Accordingly, the voltage difference across the control input and the output may be maintained (curve 521), e.g., less than the first threshold voltage (curve 522). For example, the voltage difference across the control input and the output may be correspondingly maintained at less than 1 V (e.g., near, or substantially at, 0 V). In this way, the protection circuit may prevent the voltage difference across the control input and the output from reaching the first threshold voltage, such that the cutoff circuit may remain in the OFF state (curve 501). Between t3 and t4, an extended time interval is indicated by a break in the abscissa during which a cause of the negative voltage at the output of the cutoff circuit, such as the reverse bias voltage condition, may end.

At t4, the second example operating sequence of the vehicle battery system may begin. Accordingly, between t4 and t5, each of the cutoff circuit state (curve 503) and the low-current leakage transistor state (curve 533) may be the OFF state.

At t5, a switch ON request may be received by the vehicle battery system for the cutoff circuit, and a voltage may be applied to the control input of the cutoff circuit. Thus, between t5 and t6, the voltage difference across the control input of the cutoff circuit and the output of the cutoff circuit may increase (curve 523) until, at t6, the first threshold voltage is reached (curve 524) and the cutoff circuit switched from the OFF state to the ON state. The voltage difference across the control input and the output may continue to increase to a constant voltage value. Correspondingly, after t6, the voltage applied to the output of the cutoff circuit may increase to a constant (positive) voltage value (curve 513).

During the second example operating sequence, each of the $V_{BE}$ and the $V_{CE}$ of the low-current leakage transistor remain at constant voltage values near, or substantially at, 0 V (curves 543 and 553, respectively). Accordingly, the $V_{BE}$ does not reach the second threshold voltage (curve 544) during the second example operating sequence, and the low-current leakage transistor remains in the OFF state (curve 533). In this way, in some examples, the protection circuit may not be activated in response to the vehicle battery system receiving a switch ON request for the cutoff circuit.

Figure 5B:
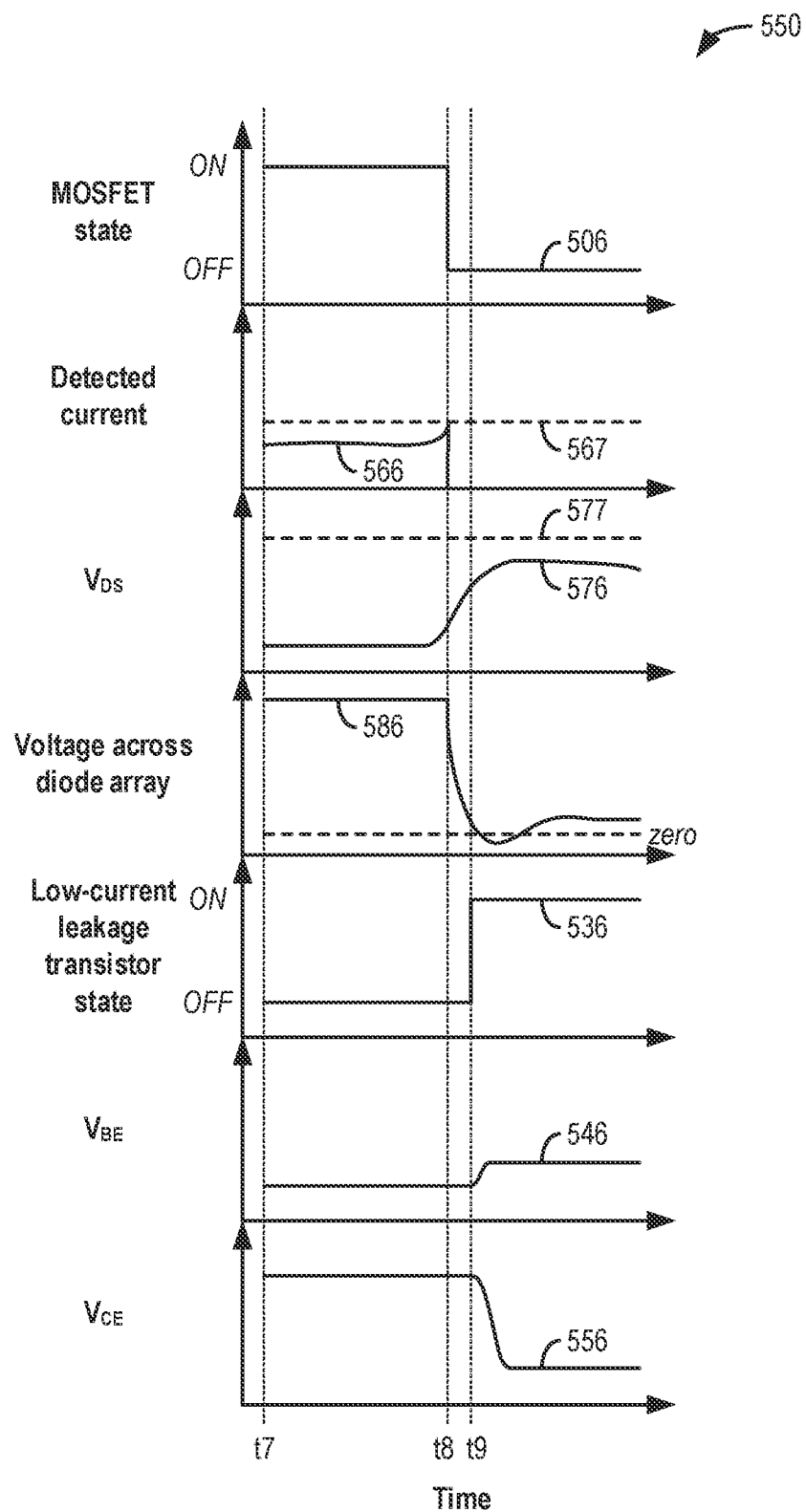
FIG. 5B shows a third example operating sequence for the BMS.

Referring now to FIG. 5B, a timeline 550 depicting a third example operating sequence of the vehicle battery system of FIGS. 1A-3B is shown. Specifically, the vehicle battery system may be configured with one or more cutoff circuits, such as one or more MOSFETs, coupled to one or more protection circuits. A given cutoff circuit may switch ON responsive to a switch ON request received by the vehicle battery system, which may allow current to flow through the given cutoff circuit to power a vehicle in which the vehicle battery system may be implemented. However, in some examples, the given cutoff circuit may be switched to an OFF state in response to a short circuit condition being detected. In such examples, a protection circuit coupled to the given cutoff circuit may include a low-current leakage transistor, such as a BJT. When switched ON, the low-current leakage transistor may be configured to reduce and maintain a voltage applied at a control input and an output of the given cutoff circuit, such that the given cutoff circuit is not unintentionally switched ON. The protection circuit may further include a diode array, such as an array of flyback or freewheeling diodes, coupled to each of the low-current leakage transistor and an external load. In this way, the protection circuit may mitigate degradation to the vehicle battery system during a short-circuit condition by cycling and dissipating excess current across the diode array and the external load while maintaining the cutoff circuit in the OFF state. In some examples, the vehicle battery system may include the BMS 208 described above with reference to FIG. 2 or the BMS 308 described above with reference to FIG. 3A (and FIG. 3B).

Timeline 550 depicts a cutoff circuit state at a solid curve 506, a current detected by the BMS at a solid curve 566, a voltage difference between an input and the output of the cutoff circuit at a solid curve 576, a voltage difference across the diode array (that is, a voltage difference between cathodes and anodes of the array of freewheeling diodes) at solid curve 586, a low-current leakage transistor state at a solid curve 536, a $V_{BE}$ of the low-current leakage transistor at a solid curve 546, and a WE of the low-current leakage transistor at a solid curve 556. Additionally, a dashed curve 567 represents a threshold current at which a switch OFF may be generated for the cutoff circuit and a dashed curve 577 represents a breakdown voltage of the cutoff circuit above which the cutoff circuit may enter avalanche mode. It will be appreciated that, when the cutoff circuit includes a MOSFET, the voltage difference across the input and the output (curve 576) may be a drain-source voltage (VDs) of the MOSFET.

All curves are depicted over time and plotted along an abscissa, where time increases from left to right of the abscissa. Further, a dependent variable represented by each curve discussed above is plotted along a respective ordinate, where the dependent variable increases from bottom to top of the given ordinate (unless otherwise stated or shown).

At t7, the third example operating sequence of the vehicle battery system may begin. Between t7 and t8, the cutoff circuit state (curve 506) may be the ON state and the low-current leakage transistor state (curve 536) may be the OFF state. Just before t8, the detected current may increase (curve 566) towards the threshold current (curve 567) as a result of a short-circuit condition in the vehicle battery system. Concomitantly, the voltage difference across the input and the output of the cutoff circuit may increase (curve 576).

In response to the detected current (curve 566) reaching the threshold current (curve 567), at t8, the cutoff circuit may switch from the ON state to the OFF state (curve 506) to prevent current flow thereacross and drop the detected current. Further, in response to the cutoff circuit switching OFF, a current may be redirected from ground to a Zener diode (or a TVS diode) coupled to the low-current leakage transistor.

As further shown at t8, the voltage difference across the diode array may decrease and dip below 0 V (curve 586), allowing the diode array to provide a first current path of lower resistance than the cutoff circuit. Accordingly, excess current accumulated in the vehicle battery system as a result of the short-circuit condition may be redirected to the first current path. In this way, current may cycle and dissipate across the diode array and the external load coupled thereto after the cutoff circuit is switched OFF.

At t9, the low-current leakage transistor may switch from the OFF state to the ON state (curve 536). The current may thus flow through the low-current leakage transistor instead of the cutoff circuit, as the low-current leakage transistor may be coupled to a second current path of lower resistance than the cutoff circuit. The current may then continue to flow from the low-current leakage transistor to the diode array.

After t9, the WE may decrease significantly (curve 556), for example, from about 12 V to less than 1 V, near 0 V, or substantially 0 V. Further, the $V_{BE}$ may increase and level off at a value clamped by the Zener diode (curve 546). For example, $V_{BE}$ may increase to about 0.7 V. Further, in the vehicle battery system corresponding to the depicted example, the control input of the cutoff circuit may be coupled to a collector terminal of the low-current leakage transistor, and the output of the cutoff circuit may be coupled to an emitter terminal of the low-current leakage transistor. Correspondingly, the voltage difference across the control input and the output may decrease in magnitude to less than 1 V, to near 0 V, or to substantially 0 V. In this way, the protection circuit may prevent the voltage difference across the control input and the output from reaching the first threshold voltage, such that the cutoff circuit may remain in the OFF state (curve 506).

Further, as a result of current redirection and dissipation provided by the diode array and the external load, the voltage difference across the input and the output of the cutoff circuit (curve 576) may level off. Additionally, since the cutoff circuit is in the OFF state (curve 506), the voltage difference across the diode array (curve 586) may also level off at a positive value (though the current may continue to flow to the diode array from the low-current leakage transistor). Specifically, because the cutoff circuit is maintained open by current redirection to the low-current leakage transistor via the second current path and the voltage difference across the input and the output thereof is maintained below the breakdown voltage (curve 577) by current redirection to the diode array via the first current path, additional current from the battery pack is restricted (e.g., substantially restricted) from flowing across the cutoff circuit, and the voltage difference across the diode array stabilizes. In this way, the protection circuit may prevent the voltage difference across the input and the output of the cutoff circuit from reaching the breakdown voltage, thereby preventing the cutoff circuit from entering avalanche mode when switched OFF.

Referring now to FIG. 6, a schematic diagram 600 depicting a printed circuit board assembly (PCBA) 624 is shown. The PCBA 624 may include a printed circuit board (PCB) 626 having various electronics components printed, soldered, or otherwise affixed thereon. In one example, the PCBA 624 may implement a BMS, such as the BMS 208 describe above with reference to FIG. 2 or the BMS 308 described above with reference to FIG. 3A (and FIG. 3B). As such, the PCBA 624 may include various circuits and electronics components operable to monitor a battery system. For example, the PCBA 624 may include a cutoff circuit formed from an array of MOSFETs 610, where inputs and outputs of the MOSFETs 610 may be coupled to a first busbar 628a and a second busbar 628b, respectively. The PCBA 602 may further include an array of flyback or freewheeling diodes 634 where cathodes and anodes of the freewheeling diodes 634 may be coupled to the second busbar 628b and a third busbar 628c, respectively. It will further be appreciated that additional electronics components may be printed, soldered, or otherwise affixed on a side of the PCB 626 opposite to a side of the PCB 626 depicted in FIG. 6. As a non-limiting example, the array of freewheeling diodes 634 may include two freewheeling diodes on one side of the PCB 626 (as shown in FIG. 6) and two freewheeling diodes on an opposite side of the PCB 626 (not shown in FIG. 6).

As shown, the busbars 628a, 628b, 628c may respectively include couplings 630a, 630b, 620c. The couplings 630a, 630b, 630c may be independently configured to couple (directly or via electrical conductors) the busbars 628a, 628b, 628c to battery terminals (for example, electrode tabs, terminal posts, etc.; not shown at FIG. 6) of the battery system. As a first example, the first busbar 628a may couple a positive supply line of the battery pack to the inputs of the array of MOSFETs 610 via the coupling 630a. As a second example, the second busbar 628b may couple a positive terminal post to each of the outputs of the array of MOSFETs 610 and each of the cathodes of the array of freewheeling diodes 634 via the coupling 630b. As a third example, the third busbar 628c may couple a negative terminal post to each of the anodes of the array of freewheeling diodes 634 via the coupling 630c. Each of the first and second busbars 628a, 628b may be coupled to one or more MOSFETs 610 in the array of MOSFETs 610, such that when the one or more MOSFETs 610 are switched ON, a circuit between a given pair of battery terminals may be closed.

The busbars 628a, 628b, 628c may further include pins 636a, 636b, 636c, respectively. The pins 636a, 636b, 636c may respectively couple the busbars 628a, 628b, 628c to the various electronics components included in the PCBA 624. As a first example, the pins 636a may independently directly couple the first busbar 628a to each of the inputs of the array of MOSFETs 610. As a second example, the pins 636b may independently directly couple the second busbar 628b to each of the outputs of the array of MOSFETs 610 and the cathodes of the array of freewheeling diodes 634. As a third example, the pins 636c may independently directly couple the third busbar 628c to each of the anodes of the array of freewheeling diodes 634. The pins 636a, 636b, 636c may further function as shunts to distribute current and may respectively structurally stabilize the busbars 628a, 628b, 628c.

Dashed directional arrows 696 depict exemplary current flow when the cutoff circuit is in an ON state. Specifically, and as shown by the directional arrows 696, the BMS may be configured to sequentially flow a current from the first busbar 628a to the second busbar 628b to the third busbar 628c when the cutoff circuit is in the ON state, such that the current may directed across the electrical load to the battery pack, and not the array of freewheeling diodes 634.

Further, dotted directional arrows 698 depict exemplary current flow when the cutoff circuit is in an OFF state. Specifically, and as shown by the directional arrows 698, the BMS may be configured to flow the current from the third busbar 826c to the second busbar 628b when the cutoff circuit is in the OFF state, such that the current may be redirected across the array of freewheeling diodes 634.

The busbars 628a, 628b, 628c may be further configured to reduce parasitic inductances present in the battery system. As a first example, the first busbar 628a may be configured to reduce a parasitic inductance between the battery pack and the array of MOSFETs 610. As a second example, the second busbar 628b may be configured to reduce a parasitic inductance between the cathodes of the array of freewheeling diodes 634 and the positive terminal post. As a third example, the third busbar 628c may be configured to reduce a parasitic inductance between the anodes of the array of freewheeling diodes 634 and the negative terminal post. In this way, the battery system may include a plurality of busbars for redirecting and distributing current during both expected and unexpected operations of the battery system In this way, a vehicle battery system including a battery pack coupled to a battery management system (BMS) is provided, where the BMS may include a reverse bias protection circuit for maintaining a cutoff circuit in an OFF state during an unexpected voltage condition and at least some components of a short-circuit protection circuit for cycling and dissipating excess current generated via the unexpected voltage condition. The BMS may further include a current detection circuit for detecting excess or anomalous current flow indicative of the unexpected voltage condition. In some examples, the cutoff circuit may include a metal-oxide-semiconductor field-effect transistor (MOSFET). Specifically, the reverse bias protection circuit may maintain a gate-source voltage ($V_{GS}$) of the MOSFET below a threshold voltage ($V_{th}$) unless both the current detected by the current detection circuit has dissipated via the short-circuit protection circuit and a switch ON request is received at the BMS. In some examples, the short-circuit protection circuit may include a diode array coupled between positive and negative terminal posts of the battery pack, such that the diode array may further be coupled to an electrical load of the vehicle battery system. Accordingly, the diode array may provide a low-resistance path for current dissipation by permitting cycling thereacross and across the electrical load. A technical effect of providing both the reverse bias protection circuit and the short-circuit protection circuit is that the MOSFET may be both maintained OFF and prevented from entering avalanche mode during application of a reverse bias voltage or during a short-circuit event. Accordingly, the MOSFET, and thereby the vehicle battery system as a whole, may be protected from degradation during the unexpected voltage condition.

In one example, a vehicle battery system comprises a battery management system comprising a MOSFET, a battery pack having a plurality of stacked battery cells, a positive supply line of the battery pack being coupled to the MOSFET and a reverse bias protection circuit coupled to the MOSFET, the reverse bias protection circuit comprising a low-current leakage transistor configured to maintain a gate-source voltage ($V_{GS}$) of the MOSFET below a threshold voltage ($V_{th}$) of the MOSFET.

In another example, a vehicle battery system comprises a battery management system (BMS) comprising a cutoff circuit electrically coupled to reverse bias protection circuit, and a battery pack having a plurality of stacked battery cells, a positive supply line of the battery pack being electrically coupled to the cutoff circuit, and wherein the reverse bias protection circuit includes each of an input electrically coupled to a control input of the cutoff circuit, an output electrically coupled to an output of the cutoff circuit, and a control input electrically coupled to the output of the cutoff circuit. A first example of the vehicle battery system further includes wherein the input of the reverse bias protection circuit, the output of the reverse bias protection circuit, and the control input of the reverse bias protection circuit are included in a switchable current path of the reverse bias protection circuit, the switchable current path arranged between the control input of the cutoff circuit and the output of the cutoff circuit. A second example of the vehicle battery system, optionally including the first example of the vehicle battery system, further includes wherein the BMS is configured to flow electric current through the switchable current path upon detection of a reverse bias voltage at the output of the cutoff circuit, and wherein the BMS is further configured to prevent electric current flow through the switchable current path in response to an absence of the reverse bias voltage at the output of the cutoff circuit. A third example of the vehicle battery system, optionally including one or more of the first and second examples of the vehicle battery system, further includes wherein the reverse bias protection circuit comprises one or more diodes, the one or more diodes configured to feed the electric current to the switchable current path upon detection of the reverse bias voltage. A fourth example of the vehicle battery system, optionally including one or more of the first through third examples of the vehicle battery system, further includes wherein the input of the reverse bias protection circuit, the output of the reverse bias protection circuit, and the control input of the reverse bias protection circuit are included in a low-current leakage transistor coupled to a Zener diode, the Zener diode configured to switch ON the low-current leakage transistor by increasing a base-emitter voltage ($V_{BE}$) of the low-current leakage transistor. A fifth example of the vehicle battery system, optionally including one or more of the first through fourth examples of the vehicle battery system, further includes wherein the low-current leakage transistor and the cutoff circuit are configured such that a collector-emitter voltage ($V_{CE}$) of the low-current leakage transistor reduces a voltage across the control input of the cutoff circuit and the output of the cutoff circuit when the low-current leakage transistor is switched ON. A sixth example of the vehicle battery system, optionally including one or more of the first through fifth examples of the vehicle battery system, further includes wherein the WE of the low-current leakage transistor is decreased to and maintained at less than 1 V when the low-current leakage transistor is switched ON. A seventh example of the vehicle battery system, optionally including one or more of the first through sixth examples of the vehicle battery system, further includes wherein the BMS comprises a driver integrated circuit, the driver integrated circuit electrically coupled to the reverse bias protection circuit via three pins. An eighth example of the vehicle battery system, optionally including one or more of the first through seventh examples of the vehicle battery system, further includes wherein the three pins comprise a first pin configured to switch the cutoff circuit to an ON state, a second pin configured to switch the cutoff circuit to an OFF state, and a third pin configured as a reference pin for controlling a voltage across the control input of the cutoff circuit and the output of the cutoff circuit.

In yet another example, a battery management system comprises a protection circuit comprising a low-current leakage junction transistor, and a MOSFET comprising a drain terminal, a gate terminal, and a source terminal, the drain terminal directly coupled to a positive supply line of a battery pack having a plurality of battery cells, the source terminal directly coupled to each of an electrical load and the low-current leakage junction transistor, and the gate terminal coupled to the low-current leakage junction transistor, wherein the protection circuit is configured to maintain the MOSFET in an OFF state in response to a reverse bias voltage being applied to the source terminal. A first example of the battery management system, further includes wherein the low-current leakage junction transistor comprises a collector terminal, a base terminal, and an emitter terminal, wherein the collector terminal of the low-current leakage junction transistor is coupled to the gate terminal of the MOSFET via each of a first resistor and a first diode, and wherein the emitter terminal of the low-current leakage junction transistor is directly coupled to the source terminal of the MOSFET. A second example of the battery management system, optionally including the first example of the battery management system, further includes wherein the protection circuit comprises a second diode, wherein the second diode is a Zener diode, wherein the emitter terminal is further coupled to an anode of the second diode, wherein the base terminal is coupled to a cathode of the second diode via a second resistor, and wherein the second diode is configured to switch the low-current leakage junction transistor to an ON state by increasing a base-emitter voltage ($V_{BE}$) of the low-current leakage junction transistor in response to the reverse bias voltage being applied to the source terminal. A third example of the battery management system, optionally including one or more of the first and second examples of the battery management system, further includes wherein the first diode is coupled to the collector terminal to maintain a direction of current flow to the low-current leakage junction transistor in response to the reverse bias voltage being applied to the source terminal. A fourth example of the battery management system, optionally including one or more of the first through third examples of the battery management system, further includes wherein decreasing and maintaining the MOSFET in the OFF state comprises maintaining a collector-emitter voltage ($V_{CE}$) of the low-current leakage junction transistor, the MOSFET maintained in the OFF state by correspondingly maintaining a gate-source voltage ($V_{GS}$) of the MOSFET below a threshold voltage ($V_{th}$) of the MOSFET. A fifth example of the battery management system, optionally including one or more of the first through fourth examples of the battery management system, further includes wherein decreasing and maintaining the $V_{CE}$ of the low-current leakage junction transistor comprises decreasing the $V_{CE}$ to and maintaining the $V_{CE}$ at below 1 V. A sixth example of the battery management system, optionally including one or more of the first through fifth examples of the battery management system, further comprises a driver integrated circuit coupled to the protection circuit, wherein the driver integrated circuit is configured to switch the MOSFET to an ON state responsive to receiving a switch ON request generated via a controller coupled to the driver integrated circuit. A seventh example of the battery management system, optionally including one or more of the first through sixth examples of the battery management system, further includes wherein the driver integrated circuit comprises a first output, a second output, and a third output, where the first output is configured to pull up a voltage of the gate terminal ($V_G$), the second output is configured to pull the $V_G$ to ground, and the third output is configured to regulate a voltage of the source terminal ($V_S$). An eighth example of the battery management system, optionally including one or more of the first through seventh examples of the battery management system, further includes wherein two diodes are coupled to the first output of the driver integrated circuit towards feed a current to the gate terminal in response to the reverse bias voltage being applied to the source terminal. A ninth example of the battery management system, optionally including one or more of the first through eighth examples of the battery management system, further includes wherein a diode is coupled to the second output of the driver integrated circuit to maintain a direction of current flow to the driver integrated circuit when the $V_G$ is pulled to ground. A tenth example of the battery management system, optionally including one or more of the first through ninth examples of the battery management system, further includes wherein a diode is coupled to the third output of the driver integrated circuit to feed a current towards the source terminal in response to the reverse bias voltage being applied to the source terminal.

In yet another example, a method for managing current flow through a battery pack cutoff circuit comprises flowing a current from a first node that is coupled to a control input of the battery pack cutoff circuit to a second node that is coupled to an output of the battery pack cutoff circuit while preventing current flow across the control input to the output in response to a negative voltage being applied to the second node. A first example of the method further comprises not flowing the current from the first node to the second node in response to an absence of the negative voltage at the second node. A second example of the method, optionally including the first example of the method, further includes wherein flowing the current from the first node to the second node is enabled by activating a transistor. A third example of the method, optionally including one or more of the first and second examples of the method, further includes wherein the current flows from ground to the transistor by flowing through two diodes.

In yet another example, a vehicle battery system comprises a battery management system (BMS) comprising a cutoff circuit electrically coupled to a short-circuit protection circuit, and a battery pack optionally having a plurality of stacked battery cells, where a positive supply line of the battery pack is electrically coupled to the cutoff circuit and where a ground return line of the battery pack is electrically coupled to the short-circuit protection circuit, wherein the short-circuit protection circuit comprises a diode array, where cathodes of the diode array are directly electrically coupled to a positive terminal post of the battery pack and where anodes of the diode array are directly electrically coupled to a negative terminal post of the battery pack. A first example of the vehicle battery system further includes wherein the cutoff circuit is further electrically coupled to a reverse bias protection circuit, where the reverse bias protection circuit includes a switchable current path, the switchable current path arranged between a control input of the cutoff circuit and an output of the cutoff circuit. A second example of the vehicle battery system, optionally including the first example of the vehicle battery system, further includes wherein the BMS is configured to switch OFF the cutoff circuit responsive to a short-circuit condition in the vehicle battery system, and wherein the BMS is further configured to maintain the cutoff circuit in an OFF state by flowing an electric current through the switchable current path and cycling the electric current across the diode array. A third example of the vehicle battery system, optionally including one or more of the first and second examples of the vehicle battery system, further includes wherein an electrical load is electrically coupled to the cathodes and the anodes of the diode array, and wherein cycling the electric current across the diode array further includes cycling the electric current across the electrical load. A fourth example of the vehicle battery system, optionally including one or more of the first through third examples of the vehicle battery system, further includes wherein the diode array comprises a plurality of flyback diodes electrically coupled in parallel. A fifth example of the vehicle battery system, optionally including one or more of the first through fourth examples of the vehicle battery system, further comprises a first busbar electrically coupling the positive supply line to an input of the cutoff circuit, a second busbar electrically coupling the positive terminal post to each of an output of the cutoff circuit and the cathodes of the diode array, and a third busbar electrically coupling the negative terminal post to the anodes of the diode array. A sixth example of the vehicle battery system, optionally including one or more of the first through fifth examples of the vehicle battery system, further includes wherein the BMS is configured to sequentially flow an electric current from the first busbar to the second busbar to the third busbar when the cutoff circuit is in an ON state, and wherein the BMS is further configured to flow the electric current from the third busbar to the second busbar when the cutoff circuit is in an OFF state. A seventh example of the vehicle battery system, optionally including one or more of the first through sixth examples of the vehicle battery system, further includes wherein the second busbar is configured to reduce a first parasitic inductance between the diode array and the positive terminal post, and wherein the third busbar is configured to reduce a second parasitic inductance between the diode array and the negative terminal post. An eighth example of the vehicle battery system, optionally including one or more of the first through seventh examples of the vehicle battery system, further includes wherein the BMS further comprises a driver integrated circuit electrically coupled to the cutoff circuit via three pins. A ninth example of the vehicle battery system, optionally including one or more of the first through eighth examples of the vehicle battery system, further includes wherein the three pins comprise a first pin configured to switch the cutoff circuit to an ON state, a second pin configured to switch the cutoff circuit to an OFF state, and a third pin configured as a reference pin for controlling a voltage across a control input of the cutoff circuit and an output of the cutoff circuit. A tenth example of the vehicle battery system, optionally including one or more of the first through ninth examples of the vehicle battery system, further comprises a shunt resistor electrically coupling the battery pack to the diode array.

In yet another example, a battery management system comprises a protection circuit comprising a low-current leakage junction transistor and an array of freewheeling diodes, and a MOSFET comprising a drain terminal, a gate terminal, and a source terminal, where the drain terminal is directly coupled to a positive supply line of a battery pack optionally having a plurality of battery cells, where the source terminal is directly coupled to the low-current leakage junction transistor, the source terminal further coupled to the array of freewheeling diodes, and where the gate terminal is coupled to the low-current leakage junction transistor, wherein the protection circuit is configured to, responsive to detection of a voltage greater than a voltage of the battery pack, switch the MOSFET from an ON state to an OFF state and maintain the OFF state. A first example of the battery management system further includes wherein the low-current leakage junction transistor comprises a collector terminal, a base terminal, and an emitter terminal, wherein the collector terminal of the low-current leakage junction transistor is coupled to the gate terminal of the MOSFET via a resistor and a diode, and wherein the emitter terminal of the low-current leakage junction transistor is directly coupled to the source terminal of the MOSFET. A second example of the battery management system, optionally including the first example of the battery management system, further includes wherein the diode maintains a direction of current flow to the low-current leakage junction transistor in response to the voltage greater than the voltage of the battery pack being detected. A third example of the battery management system, optionally including one or more of the first and second examples of the battery management system, further includes wherein the emitter terminal of the low-current leakage junction transistor is coupled to the array of freewheeling diodes via a busbar to maintain a direction of current flow to the array of freewheeling diodes in response to the voltage greater than the voltage of the battery pack being detected. A fourth example of the battery management system, optionally including one or more of the first through third examples of the battery management system, further comprises a driver integrated circuit coupled to the MOSFET via the protection circuit, wherein the driver integrated circuit is configured to open or close the MOSFET in response to receiving a switching request generated via a controller coupled to the driver integrated circuit. A fifth example of the battery management system, optionally including one or more of the first through fourth examples of the battery management system, further comprises a current detection circuit, the current detection circuit electrically coupled to the MOSFET and communicably coupled to the driver integrated circuit, wherein the current detection circuit is configured to obtain a measurement of a current flowing to the MOSFET and transmit the measurement to the controller, the controller configured to detect the voltage greater than the voltage of the battery pack based on the measurement.

In yet another example, a method for managing current flow through a cutoff circuit of a battery pack, the method comprising flowing a current from a first battery terminal to an external load and preventing current flow from a second battery terminal to the first battery terminal when the cutoff circuit is closed, and flowing the current from the second battery terminal to the first battery terminal when the cutoff circuit is open. A first example of the method further comprises, responsive to detecting the current between the battery pack and the cutoff circuit greater than a threshold current, flowing the current from a first node that is coupled to a control input of the cutoff circuit to a second node that is coupled to an output of the cutoff circuit while preventing current flow across the control input to the output, and responsive to detecting the current between the battery pack and the cutoff circuit less than or equal to the threshold current, not flowing the current from the first node to the second node. A second example of the method, optionally including the first example of the method, further comprises, responsive to detecting the current greater than the threshold current, opening the cutoff circuit to restrict current flow thereacross.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A battery management system, comprising:
   a protection circuit comprising a low-current leakage junction transistor and an over voltage clamping diode; and
   an n-channel MOSFET comprising a drain terminal, a gate terminal, and a source terminal,
      where the drain terminal is directly coupled to a positive supply line of a battery pack,
      where the source terminal is directly coupled to the low-current leakage junction transistor, the source terminal further coupled to the over voltage clamping diode to dissipate current away from the n-channel MOSFET when the n-channel MOSFET is switched to OFF, and
      where the gate terminal is coupled to the low-current leakage junction transistor,
   wherein the protection circuit is configured to, responsive to detection of a voltage greater than a voltage of the battery pack, switch the n-channel MOSFET from an ON state to an OFF state and maintain the OFF state.

2. The battery management system of claim 1, wherein the low-current leakage junction transistor comprises a collector terminal, a base terminal, and an emitter terminal,
   wherein the collector terminal of the low-current leakage junction transistor is coupled to the gate terminal of the n-channel MOSFET via a resistor and a diode, and
   wherein the emitter terminal of the low-current leakage junction transistor is directly coupled to the source terminal of the n-channel MOSFET.

3. The battery management system of claim 2, wherein the diode maintains a direction of current flow to the low-current leakage junction transistor in response to the voltage greater than the voltage of the battery pack being detected.

4. The battery management system of claim 2, wherein the emitter terminal of the low-current leakage junction transistor is coupled to the over voltage clamping diode via a busbar to maintain a direction of current flow to the over voltage clamping diode in response to the voltage greater than the voltage of the battery pack being detected.

5. The battery management system of claim 1, further comprising a driver integrated circuit coupled to the n-channel MOSFET via the protection circuit, wherein the driver integrated circuit is configured to open or close the n-channel MOSFET in response to receiving a switching request generated via a controller coupled to the driver integrated circuit.

6. The battery management system of claim 5, further comprising a current detection circuit, the current detection circuit electrically coupled to the n-channel MOSFET and communicably coupled to the driver integrated circuit,
   wherein the current detection circuit is configured to obtain a measurement of a current flowing to the n-channel MOSFET and transmit the measurement to the controller, the controller configured to detect the voltage greater than the voltage of the battery pack based on the measurement.

7. A battery management system, comprising:
   a protection circuit comprising a low-current leakage junction transistor, an over voltage clamping diode;
   an n-channel MOSFET comprising a drain terminal, a gate terminal, and a source terminal;
   a driver integrated circuit coupled to the n-channel MOSFET via the protection circuit; and
   a current detection circuit communicably coupled to the driver integrated circuit configured to transmit a measurement of currents passing to the n-channel MOSFET,
   wherein the protection circuit is configured to, responsive to detection of a voltage greater than a voltage of a battery pack, switch the n-channel MOSFET from an ON state to an OFF state and maintain the OFF state.

8. The battery management system of claim 7, wherein the drain terminal of the n-channel MOSFET is directly coupled to a positive supply line of the battery pack, wherein the source terminal of the n-channel MOSFET is directly coupled to the low-current leakage junction transistor, the source terminal further coupled to the over voltage clamping diode, wherein the over voltage clamping diode is a transient voltage protection diode, and wherein the gate terminal is coupled to the low-current leakage junction transistor.

9. The battery management system of claim 7, wherein the driver integrated circuit is configured to open or close the n-channel MOSFET in response to receiving a switching request generated via a controller coupled to the driver integrated circuit.

10. The battery management system of claim 7, wherein the current detection circuit is electrically coupled to the n-channel MOSFET.

11. The battery management system of claim 10, wherein the current detection circuit is configured to obtain a measurement of a current flowing to the n-channel MOSFET and transmit the measurement to a controller, the controller configured to detect the voltage greater than the voltage of the battery pack based on the measurement.

12. The battery management system of claim 7, wherein the low-current leakage junction transistor comprises a collector terminal, a base terminal, and an emitter terminal,
   wherein the collector terminal of the low-current leakage junction transistor is coupled to the gate terminal of the n-channel MOSFET via a resistor and a diode, and
   wherein the emitter terminal of the low-current leakage junction transistor is directly coupled to the source terminal of the n-channel MOSFET.

13. The battery management system of claim 12, wherein the diode maintains a direction of current flow to the low-current leakage junction transistor in response to the voltage greater than the voltage of the battery pack being detected.

14. A battery management system, comprising:
   a protection circuit comprising a low-current leakage junction transistor, and an over voltage clamping diode;
   an n-channel MOSFET comprising a drain terminal, a gate terminal, and a source terminal, wherein the low-current leakage junction transistor comprises a collector terminal, a base terminal, and an emitter terminal; and wherein the over voltage clamping diode is coupled to a busbar and to the emitter terminal of the low current leakage junction transistor via the busbar to maintain a direction of current flow to over voltage clamping diode in response to a voltage greater than a voltage of a battery pack being detected.

15. The battery management system of claim 14, wherein the drain terminal of the n-channel MOSFET is directly coupled to a positive supply line of the battery pack, and wherein the source terminal of the n-channel MOSFET is directly coupled to the low-current leakage junction transistor, the source terminal further coupled to the over voltage clamping diode, and wherein the gate terminal is coupled to the low-current leakage junction transistor.

16. The battery management system of claim 14, wherein the collector terminal of the low-current leakage junction transistor is coupled to the gate terminal of the n-channel MOSFET via a resistor and a diode, and wherein the emitter terminal of the low-current leakage junction transistor is directly coupled to the source terminal of the n-channel MOSFET.

17. The battery management system of claim 16, wherein the diode maintains a direction of current flow to the low-current leakage junction transistor in response to the voltage greater than the voltage of the battery pack being detected.

18. The battery management system of claim 14, further comprising a driver integrated circuit coupled to the n-channel MOSFET via the protection circuit, wherein the driver integrated circuit is configured to open or close the n-channel MOSFET in response to receiving a switching request generated via a controller coupled to the driver integrated circuit.

19. The battery management system of claim 18, further comprising a current detection circuit, the current detection circuit electrically coupled to the n-channel MOSFET and communicably coupled to the driver integrated circuit.

20. The battery management system of claim 19, wherein the current detection circuit is configured to obtain a measurement of a current flowing to the n-channel MOSFET and transmit the measurement to the controller, the controller configured to detect the voltage greater than the voltage of the battery pack based on the measurement.

* * * * *